US012372365B2

(12) United States Patent
Styles et al.

(10) Patent No.: US 12,372,365 B2
(45) Date of Patent: Jul. 29, 2025

(54) DELIVERY OPTIMIZATION

(71) Applicant: Ford Global Technologies, LLC, Dearborn, MI (US)

(72) Inventors: Owen David Styles, Essex (GB); William John Mallard, Essex (GB)

(73) Assignee: Ford Global Technologies, LLC, Dearborn, MI (US)

( * ) Notice: Subject to any disclaimer, the term of this patent is extended or adjusted under 35 U.S.C. 154(b) by 119 days.

(21) Appl. No.: 17/166,571

(22) Filed: Feb. 3, 2021

(65) Prior Publication Data
US 2021/0254988 A1    Aug. 19, 2021

(30) Foreign Application Priority Data

Feb. 17, 2020    (GB) ..................................... 2002119

(51) Int. Cl.
*G01C 21/34*    (2006.01)
*B60W 60/00*    (2020.01)
(Continued)

(52) U.S. Cl.
CPC ..... *G01C 21/3469* (2013.01); *B60W 60/0023* (2020.02); *B60W 60/0025* (2020.02);
(Continued)

(58) Field of Classification Search
None
See application file for complete search history.

(56) References Cited

U.S. PATENT DOCUMENTS

| 5,070,959 A | 12/1991 | Grabowski |
| 2011/0112710 A1 | 5/2011 | Meyer-Ebeling et al. |

(Continued)

FOREIGN PATENT DOCUMENTS

DE    102014200450 A1    7/2015

OTHER PUBLICATIONS

Schrimpf, G., Schneider, J., Stamm-Wilbrandt, H., & Dueck, G. (2000). Record Breaking Optimization Results Using the Ruin and Recreate Principle. Journal of Computational Physics, 159, 139-171. (Year: 2000).*

(Continued)

*Primary Examiner* — Faris S Almatrahi
*Assistant Examiner* — Selena M Jin
(74) *Attorney, Agent, or Firm* — Joseph Zane; Brooks Kushman P.C.

(57) ABSTRACT

A plurality of items includes a first item deliverable to a first delivery destination and a second item deliverable to a second delivery destination. The value of a first vehicle parameter dependent on a mass of the first item and a mass of the second item is calculated for a first delivery route, the first delivery route being configured to stop at the first delivery destination before the second delivery destination to thereby deliver the first item before the second. The value of a first vehicle parameter for a second delivery route is calculated, the second delivery route being configured to stop at the second delivery destination before the first delivery destination to thereby deliver the second item before the first. A delivery route is determined that comprises the first and second delivery destinations that optimizes the value of the first vehicle parameter.

20 Claims, 7 Drawing Sheets

(51) Int. Cl.
    *G05D 1/00*           (2024.01)
    *G06Q 10/047*       (2023.01)
    *G06Q 10/0631*      (2023.01)
    *G06Q 10/0835*      (2023.01)
    *G06Q 30/018*       (2023.01)
    *G07C 5/08*           (2006.01)

(52) U.S. Cl.
    CPC ......... *G05D 1/0297* (2013.01); *G06Q 10/047* (2013.01); *G06Q 10/06316* (2013.01); *G06Q 10/08355* (2013.01); *G07C 5/08* (2013.01); *B60W 2510/24* (2013.01); *G06Q 30/018* (2013.01)

(56) References Cited

U.S. PATENT DOCUMENTS

| | | |
|---|---|---|
| 2012/0038314 A1 | 2/2012 | Stewart et al. |
| 2014/0005879 A1 | 1/2014 | Poechmueller et al. |
| 2015/0283919 A1 | 10/2015 | Baek et al. |
| 2017/0327120 A1 | 11/2017 | Oh et al. |
| 2019/0287051 A1* | 9/2019 | Heinla ............... G06Q 50/28 |
| 2019/0325376 A1* | 10/2019 | Khasis ............... G06Q 10/083 |
| 2020/0217672 A1* | 7/2020 | Deng ............... G06Q 10/06316 |
| 2021/0035064 A1* | 2/2021 | Nishikawa ............ A61B 5/024 |
| 2021/0090143 A1* | 3/2021 | Chalkley ............. H04N 23/69 |
| 2022/0092532 A1* | 3/2022 | Bevan ............... G06Q 10/0835 |

OTHER PUBLICATIONS

D. Baek, Y. Chen, E. Macii, M. Poncino and N. Chang, "Battery-Aware Electric Truck Delivery Route Planner," 2019 IEEE/ACM International Symposium on Low Power Electronics and Design (ISLPED), Lausanne, Switzerland, 2019, pp. 1-6, doi: 10.1109/ISLPED.2019.8824835. (Year: 2019).*

Proposed Examiner Amendments (Year: 2025).*

* cited by examiner

DELIVERY OPTIMIZATION

CROSS-REFERENCE TO RELATED APPLICATIONS

This application claims foreign priority benefits under 35 U.S.C. § 119(a)-(d) to GB Application 2 002 119.2 filed Feb. 17, 2020, which is hereby incorporated by reference in its entirety.

TECHNICAL FIELD

The present disclosure relates to a method and controller for optimizing the delivery of a plurality of items to a plurality of delivery destinations, and is particularly, although not exclusively, concerned with a method for delivering a plurality of items to a plurality of delivery destinations in an energy-efficient way.

BACKGROUND

The range of a vehicle can be at least partially dependent upon the amount of energy the vehicle can store, for example the range of a petrol or diesel powered vehicle may be limited by the capacity of its fuel tank, or the range of a battery-powered electric vehicle (BPEV) may be limited by the capacity of its batteries.

Additionally, it is widely accepted that increased vehicle efficiency and reduced energy consumption are desirable so as to mitigate the effects of transport on climate change and allow climate change goals to be reached.

Accordingly, it is desirable that vehicles, whether petrol, diesel, battery-powered or otherwise, are able to perform their journeys in an energy-efficient manner without unnecessarily expending energy and/or being required to replenish their energy stores.

SUMMARY

Some examples herein relate to a method, a set of instructions, and a controller that are able to determine the most efficient delivery route to deliver a plurality of items to a plurality of delivery destinations. For example, a set of items may be required to be delivered to different destinations and there is clearly more than one way that this task can be achieved. For example, a first delivery route may deliver the first item before the second, the second before the third etc. with other delivery routes being to deliver the items in a different order. Some examples herein relate to determining which of these delivery routes are the most efficient, such that a vehicle parameter is optimized. For example, the delivery route that delivers three items (item 1, item 2, item 3) in the order "2,3,1" may be determined to be more efficient than a delivery route that delivers the items in the order "1,2,3" or "2,1,3". The "parameter" that is optimized in these examples may comprise a parameter that is related to, or dependent upon, the energy-efficiency of the vehicle. Accordingly, determining the route that optimizes this parameter may determine the most energy-efficient route. As will be explained below, the parameter may comprise the amount of energy remaining in a vehicle to deliver the items at the end of the route, the amount of energy used by the vehicle to deliver the items according to the selected route, the top speed that the vehicle reaches when following the selected route to deliver the items, the driving range and/or driving time of the vehicle during the selected delivery route to deliver the items, the number of items that the vehicle is able to carry and/or the number of trips that the vehicle is able to make.

In each case, the parameter is dependent upon the mass of each item. More specifically, according to some examples presented herein, the mass of each item to be delivered is taken into account when selecting the delivery route that optimizes the parameter. For example, the amount of energy remaining in the vehicle after delivery, or used by the vehicle to perform the delivery, is dependent on the fuel (or power) used, which is dependent on the fuel/power efficiency, or economy, of the vehicle which, in turn, is dependent on the mass of the cargo being transported by the vehicle. In other words, a vehicle delivering five items will use more energy to do so the heavier that the five items are. This is also true for parameters such as top speed, driving range, driving time, number of items being deliverable by the vehicle, and number of trips the vehicle takes to deliver the items. In these latter examples, generally speaking, and keeping certain other factors constant, the heavier the vehicle is (due to the mass of the cargo that the vehicle is stowing), the lower the theoretical top speed, the less the driving range, the more the driving time etc. to deliver each item to its intended destination.

Vehicle parameters of any vehicle are therefore dependent on, and, to a certain extent, governed by, the mass of the vehicle. When the vehicle is to perform a delivery, following a delivery route to deliver a plurality of items, the drivable range is therefore dependent on the mass of each item to be delivered. These vehicle parameters may comprise drivable range, top speed, rate of acceleration, maximum power etc.

At the beginning of any delivery route a vehicle is to deliver a set of items (say, 10), each item having an associated mass m1, . . . , m10. Therefore, the mass of the vehicle at the start of the delivery route (and up until the vehicle delivers its first item) is the mass of the vehicle without any cargo plus the mass of each item. When the vehicle delivers the first item, its mass then decreases by the mass of that first, delivered, item. Therefore, as the vehicle delivers specific items its mass decreased by the mass of the items delivered. The vehicle mass may therefore be considered to be gradually decreasing during its delivery route. This leads to an instance where the most efficient (in terms of optimizing a vehicle parameter that is dependent on mass, such as those listed above) route to deliver a set of items may be a delivery route that delivers the heaviest item first as, once that delivery is made, the reduction on the mass of the vehicle (to deliver the remaining items) is the most significant. This may be true even in cases where the delivery destination for the heaviest item is the destination farthest away from the origin of the route (e.g. a delivery depot), but it may be determined that driving the farthest distance first to drop off (thereby decrease the vehicle mass by the mass of) the heaviest item is more energy efficient in the long-term, since the vehicle mass will be more significantly reduced for the vehicle to perform the remainder of the route. Some examples herein relate to a method, instructions, and a controller, that are configured to analyze a plurality of items to be delivered and, based on their masses, determine a delivery route to deliver each item to their delivery destination, such that a vehicle parameter is optimized, wherein the vehicle parameter is dependent on the masses of the items. In this way, the selected delivery route is one that may optimize the amount of energy remaining in the engine or battery of the vehicle after delivery, the amount of energy used to make the delivery, the top vehicle speed, the driving range, the driving time, the number of items deliverable (e.g. without a stop to refuel) and/or the number of trips needed to deliver all items etc.

According to one example of the present disclosure, there is provided a method, for example a computer-implemented method, for optimizing the delivery of a plurality of items to a plurality of delivery destinations, the plurality of items comprising a first item deliverable to a first delivery destination and a second item deliverable to a second delivery destination. The method comprises calculating the value of a first vehicle parameter, the first vehicle parameter being dependent on a mass of the first item and a mass of the second item, for a first delivery route, the first delivery route being a route to stop at the first delivery destination before the second delivery destination to thereby deliver the first item before the second, calculating the value of a first vehicle parameter for a second delivery route, the second delivery route being a route to stop at the second delivery destination before the first delivery destination to thereby deliver the second item before the first, the method thereby determining a delivery route that comprises the first and second delivery destinations that optimizes the value of the first vehicle parameter.

The method is therefore able to determine the energy efficiency of a first deliver route to deliver the first item before the second, and to determine the energy efficiency of a second delivery route to deliver the second item before the first, to determine which of the first and second delivery routes optimizes the parameter more, and is therefore more energy efficient. In one example, the first delivery route may comprise a delivery route that stops at the first delivery destination before the second delivery destination to thereby deliver the first item before the second, such that the vehicle parameter is optimized; and the second delivery route may comprise a delivery route that stops at the second delivery destination before the first delivery destination to thereby deliver the second item before the first, such that the vehicle parameter is optimized. In other words, each one of the first and second delivery routes may optimize the first vehicle parameter. In another example, the first delivery route may comprise a delivery route that stops at the first delivery destination before the second delivery destination having the shortest distance, and the second delivery route may comprise a delivery route that stops at the second delivery destination before the first delivery destination to thereby deliver the second item before the first having the shortest distance. In yet another example, the first delivery route may comprise a delivery route that stops at the first delivery destination before the second delivery destination taking the shortest time, and the second delivery route may comprise a delivery route that stops at the second delivery destination before the first delivery destination to thereby deliver the second item before the first taking the shortest time.

To illustrate this by way of an example, the vehicle parameter to optimize may comprise the amount of electric power remaining in the battery of an electric vehicle, and the plurality of items may comprise a first item to be delivered to a first destination and a second item to be delivered to a second destination. The first item may weigh ten times as much as the second and the first delivery destination may be three times as far as the second destination, from an origin representing the start of the delivery route. The first delivery route in this example may comprise a route that stops at the first delivery destination before the second destination such that the battery power remaining in the vehicle is at a maximum, say at a maximum value BP1. The first delivery route in this example may comprise a route that stops at the first delivery destination before the second destination such that the battery power remaining in the vehicle is at a maximum, say at a maximum value BP2. The method described above is then able to determine which of the first and second delivery routes maximizes the remaining battery power. In other words, the method is able to determine which is greater, BP1 or BP2. Then, whichever route has the greater remaining battery power may be followed.

In these examples, the first and second delivery routes are themselves routes that optimize the vehicle parameter. In other words, the first route stops at the first destination and then the second such that the remaining battery power is at a maximum. The method is therefore able to determine which already-optimized route is the most optimized.

According to some examples, each of the first second delivery routes may also stop at an origin (e.g. a vehicle depot, e.g. a route starting point) after the final delivery destination. Therefore, the first delivery route may comprise a route to stop at the first delivery destination before the second delivery destination, and then at an origin, to thereby deliver the first item before the second and arrive at the origin, and the second delivery route may comprise a route to stop at the second delivery destination before the first delivery destination, and then at the origin, to thereby deliver the second item before the first and arrive at the origin.

In some examples, the method may comprise programming, into a route guidance system of a vehicle, the delivery route having the optimized vehicle parameter. In this example, whichever one of the first and second delivery routes optimizes the vehicle parameter is effectively automatically programmed as the route to follow by a driver of the vehicle. In another example, the method may comprise causing the vehicle to follow, e.g. drive, at least part of the delivery route having the optimized vehicle parameter, under autonomous control.

As discussed above, the first vehicle parameter may comprise at least one of an amount of energy remaining in an energy store of the vehicle, an amount of energy consumed by the vehicle in taking the delivery route, an amount of pollution emitted by the vehicle in taking the delivery route, a top speed of the vehicle, a driving range of the vehicle, a driving time of the vehicle, a number of items deliverable by the vehicle, a number of trips of the vehicle to deliver the items.

The nature of "optimizing" may be dependent upon the parameter to be optimized. For example, the example briefly discussed above referred to optimizing battery power remaining after a delivery route. In this case it may be desirable to maximize the parameter, thereby maximizing the remaining source of energy after the vehicle has performed the delivery. Optimizing may therefore comprise maximizing or minimizing. For example, it may be desirable to maximize an amount of energy remaining in an energy store of the vehicle, minimize an amount of energy consumed by the vehicle in taking the delivery route, minimize an amount of pollution emitted by the vehicle in taking the delivery route, maximize or minimize a top speed of the vehicle, maximize a driving range of the vehicle, minimize a driving time of the vehicle, maximize a number of items deliverable by the vehicle, minimize a number of trips taken by the vehicle to deliver all of the items etc.

The method may comprise transmitting a signal which, when received by a fleet management module, causes the fleet management module to transmit instructions to at least one vehicle in a fleet of vehicles to drive, following one of the first and second delivery routes.

In response to an input describing a new destination, the method may comprise modifying the first delivery route to derive a modified first delivery route, the modified first delivery route being a route to stop at the first delivery destination, then the new destination, then the second delivery destination, and/or modifying the second delivery route to derive a modified second delivery route, the modified second delivery route being a route to stop at the second delivery destination, then the new destination, then the first delivery destination, and calculating the value of the first vehicle parameter for the first and/or second modified delivery routes. For example, the new destination may be associated with the location of an item which is to be collected by the vehicle and delivered to an associated destination (e.g. a new item to be collected and delivered). The item may have an associated mass, such that the mass of the items being transported by the vehicle may increase after stopping at the new destination. Each of the first and second modified delivery routes may themselves by a route that optimizes the first vehicle parameter.

In this example, the method is able to perform "on-the-fly", e.g. in real-time or near real-time, calculations and calibrations of the delivery route to take into account a new input. The new input may describe a new destination which may represent a destination not on any one of the determined routes (e.g. a detour) and/or may represent a destination on the determine routes (e.g. a destination that is on the way that the driver would like to stop at—for example, stopping at an on-the-way service station or rest stop for lunch or a break).

The method may comprise selecting (e.g. automatically, by a processor, or manually, by a user) the first vehicle parameter and/or adjusting (e.g. automatically, by a processor, or manually, by a user) the first vehicle parameter. In these examples, a user—which may be the driver or passenger of the vehicle or a manger of a fleet of vehicles—may choose which parameter is to be optimized. For example, a user may choose whether the delivery route is to optimize (e.g. maximize) the consumed energy, or optimize (e.g. minimize) the driving time, etc. The parameter may be adjusted "on-the-fly", e.g. in real time or near real-time, in which case the method may be performed again for the remaining items to be delivered.

The method may be for optimizing the delivery of N items (e.g. with N>3) to a plurality of delivery destinations (e.g. up to N delivery destinations—for example two items may have the same delivery destination). Each one of the N items is deliverable to a delivery destination and the method may comprise calculating the value of a first vehicle parameter for a plurality of delivery routes, each delivery route in the plurality being a route to stop at the respective delivery destinations of a subset M of the N items (e.g. M<N). Each route may stop at the respective delivery destinations for the subset M items in a different order. The method may therefore calculate M! (M factorial) delivery routes. The subset M of items may correspond with and/or comprise and/or consist of the heaviest items in the set of N items (e.g. the heaviest M items). In this example, the method effectively places a weighting, or importance, on the items in terms of their mass, as a recognition that the vehicle parameter (being dependent on mass) will be most affected by the heaviest M items. Each route in the plurality of delivery routes may stop at the respective delivery destinations for the N items. Each route may therefore comprise a delivery route to deliver all N items. Each route may comprise a route that stops at the respectively delivery destinations for the M items prior to the delivery destinations for the remaining N−M items. In this example, the vehicle parameter may be calculated for routes that deliver the heaviest items first, before delivering the remaining items. Whilst the vehicle parameter value may be calculated for a plurality of routes that each deliver the M items in a specified order, the order in which the remaining N−M items are delivered may be determined according to any criteria (e.g. optimising the vehicle parameter, but not necessarily). The advantage of this example method is a reduction, potentially significant, in the computational size and complexity of calculating the vehicle parameter for each route. Rather, the parameter value is only calculated for the routes that deliver the heaviest items first, the heaviest items influencing the parameter value more than the others.

In some examples, the subset M items may be a set, e.g. predetermined, fraction of the N items, e.g. 0.1 N, 0.25 N, 0.5 N, 0.75 N. In other examples, the subset M items may be an absolute (e.g. a set or predetermined) number of items, e.g. the subset M items may be limited to an absolute number for which M factorial delivery routes are readily calculable (e.g. M=2, 3, 4, 5, 10, 20, 50, 100 or any other number, which may depend on the processing power of the means by which the routes are determined).

For example, M may be 10 and therefore the method may comprise calculating the value of a first vehicle parameter for a plurality of delivery routes, each delivery route being a route to stop at the respective delivery destinations for the heaviest 10 items, each route stopping at the destinations in a different order. In another example, M may be N/2 and therefore the method may comprise calculating the value of a first vehicle parameter for a plurality of delivery routes, each delivery route being a route to stop at the respective delivery destinations for the half of the items to be delivered, each route stopping at the destinations in a different order. In these examples, the number of different computations (e.g. the number of different routes for which the value of the first vehicle parameter is calculated) is limited to 10! (in the first example) and (N/2)! (in the second example).

The method may comprise determining whether there exists a delivery route such that a first vehicle can deliver each item to its delivery destination without stopping to replenish its energy stores and/or to refuel, such that the value of the first vehicle parameter is optimized. In other words, having regard to the available fuel or battery power in the vehicle, or that the vehicle is able to store/hold (e.g. the fuel capacity of an internal combustion engine, or the capacity of a vehicle battery), the method in some examples is able to determine whether the vehicle can make all of the deliveries. For example, it may be the case that no single route is able to deliver all items to their delivery destinations without the vehicle needing to refuel (or recharge).

In response to a determination that no delivery route exists such that the first vehicle can deliver each item to its respective destination without refueling, the method may further comprise calculating the value of the first vehicle parameter for a composite route for the first vehicle to deliver each item to its respective delivery destinations in two sub-routes, stopping to refuel in between the two sub-routes and for the sum of a first vehicle route and a second vehicle route, the first vehicle route being a route for the first vehicle to deliver a first subset of the plurality of items to their respective delivery destinations in one trip without refueling, and the second vehicle route being a route for a second vehicle to deliver a second subset of the plurality of items, the second subset comprising the remaining items, to their respective destinations in one trip without refueling.

Therefore, in this example, the method is able to determine (having regard that the vehicle cannot deliver all items in a single trip) whether the vehicle parameter is optimized for the vehicle to deliver all items in two trips or for two vehicles to each deliver a sub-set of the items. For example, it the vehicle parameter may be optimized (and it therefore be more efficient) for two vehicles to deliver the items, rather than for one vehicle to deliver all the items and re-fuel.

If the value of the first vehicle parameter is lower for the composite route then the method may comprise transmitting a signal to the first vehicle which, when received by the vehicle causes the composite route to be programmed into a route guidance system of the first vehicle and/or causes the first vehicle to begin driving the composite route, under autonomous control. If the value of the first vehicle parameter is lower for the sum of the first and second vehicle routes, then the method may comprise transmitting a signal to a fleet management module to cause the fleet management module to cause the first vehicle route to be programmed into a route guidance system of the first vehicle and the second vehicle route to be programmed into a route guidance system of the second vehicle and/or cause the first and second vehicles to begin driving the first and second vehicles routes, respectively (e.g. under autonomous control).

If a vehicle delivering the plurality of items (and/or a subset of the plurality of items) according to a given delivery route is unable to deliver one item of the plurality then the method may comprise re-calculating the value of the first vehicle parameter for the given delivery route based on the mass of the item that the vehicle is unable to deliver, determining a location of a depot at which the vehicle is able to drop off the item it is unable to deliver, and calculating the value of the first vehicle parameter for a further delivery route being a route to stop at the depot, then the respective delivery destination of all undelivered items, and determining which one of the given delivery route or further delivery route optimizes the first vehicle parameter. This may comprise re-calculating the value of the first vehicle parameter for the given delivery route (e.g. to take into account the additional mass of the vehicle, including the mass of the item not delivered).

In this example, if the driver of the vehicle is unable to deliver one of the items (for example, no-one is home or they are unable to locate the delivery destination) then the method is able to determine whether the vehicle parameter is optimized for the vehicle continuing on the given route (to deliver the remaining items) or to drive a route that stops at a depot to drop off the undelivered item. It will be appreciated that continuing on the delivery route will affect the value of the vehicle parameter, since the vehicle will include the mass of the undelivered item for the remainder of the given delivery route.

In response to a determination that the further delivery route optimizes the first vehicle parameter, the method may further comprise causing the further delivery route to be programmed into a route guidance system of the vehicle.

The first vehicle parameter may also depend upon the mass of a vehicle configured to transport at least one of the items. The first vehicle parameter may be additionally dependent upon the mass of the vehicle, which may itself vary (e.g. due to number of occupants, amount of fuel in a fuel tank etc.).

According to another example of the present disclosure there is provided a non-transitory, machine-readable, medium comprising a set of instructions (e.g. stored thereon) which, when executed by a processor, may cause the processor to perform the method as described above. For example, the instructions, when executed by a processor, may cause the processor to, for a plurality of items to be delivered to a plurality of delivery destinations, the plurality of items comprising a first item deliverable to a first delivery destination and a second item deliverable to a second delivery destination calculate the value of a first vehicle parameter, the first vehicle parameter being dependent on a mass of the first item and a mass of the second item, for a first delivery route, the first delivery route being a route to stop at the first delivery destination before the second delivery destination to thereby deliver the first item before the second, and calculate the value of a first vehicle parameter for a second delivery route, the second delivery route being a route to stop at the second delivery destination before the first delivery destination to thereby deliver the second item before the first, to thereby determine a delivery route that comprises the first and second delivery destinations that optimizes the value of the first vehicle parameter.

The first and second delivery routes may comprise those described above in relation to the method.

The instructions, when executed by the processor, may cause the processor to program, into a route guidance system of a vehicle, the delivery route having the optimized first vehicle parameter.

As described above, the vehicle parameter may comprise at least one of: an amount of energy remaining in an energy store of the vehicle, an amount of energy consumed by the vehicle taking the delivery route, a top speed of the vehicle, a driving range of the vehicle, a driving time of the vehicle, a number of items deliverable by the delivery vehicle, a number of trips of the vehicle to deliver the items.

The instructions, when executed by the processor, may cause the processor to transmit a signal which, when received by a vehicle causes the vehicle to drive, following one of the first and second delivery routes, under autonomous control.

The instructions, when executed by the processor, may cause the processor to: transmit a signal which, when received by a fleet management module, causes the fleet management module to transmit instructions to at least one vehicle in a fleet of vehicles to drive, following one of the first and second delivery routes, under autonomous control.

The instructions, when executed by the processor, may cause the processor to, in response to an input describing a new destination modify the first delivery route to derive a modified first delivery route, the modified first delivery route being a route to stop at the first delivery destination, then the new destination, then the second delivery destination, and/or modify the second delivery route to derive a modified second delivery route, the modified second delivery route being a route to stop at the second delivery destination, then the new destination, then the first delivery destination, and calculate the value of the first vehicle parameter for the first and second modified delivery routes.

The modified delivery routes may be as described in relation to the method.

The instructions, when executed by the processor, may cause the processor to select the first vehicle parameter and/or adjust the first vehicle parameter.

The instructions, when executed by the processor, may cause the processor to, for N items (with N>3) to be delivered a plurality of delivery destinations, each one of the N items being deliverable to a delivery destination: calculate the value of a first vehicle parameter for a plurality of delivery routes, each delivery route being a route to stop at the respective delivery destinations for the subset M items (with M<N), wherein each route stops at the respective delivery destinations for the heaviest M items in a different order. Each route in the plurality of delivery routes stops at the respective delivery destinations for the N items.

The M items may be as described above in relation to the method.

The instructions, when executed by the processor, may cause the processor to determine whether there exists a delivery route such that a first vehicle can deliver each item to its respective delivery destination, without stopping to refuel, such that the value of the first parameter is optimized.

The instructions, when executed by the processor, may cause the processor to, in response to a determination that no delivery route exists such that the first vehicle can deliver each item to its respective destination without refueling, calculate the value of the first vehicle parameter for: a composite route for the first vehicle to deliver each item to its respective delivery destinations in two sub-routes, stopping to refuel in between the two sub-routes, and for the sum of a first vehicle route and a second vehicle route, the first vehicle route being a route for the first vehicle to deliver a first subset of the plurality of items to their respective delivery destinations in one trip without refueling, and the second vehicle route being a route for a second vehicle to deliver a second subset of the plurality of items, to their respective destinations in one trip without refueling, for example as described above in relation to the method.

The instructions, when executed by the processor, may cause the processor to, if the value of the first vehicle parameter is lower for the composite route: transmit a signal to the first vehicle which, when received by the vehicle causes the composite route to be programmed into a route guidance system of the first vehicle and/or causes the first vehicle to begin driving the composite route, under autonomous control and, if the value of the first vehicle parameter is lower for the sum of the first and second vehicle routes: transmit a signal to a fleet management module to cause the fleet management module to cause the first vehicle route to be programmed into a route guidance system of the first vehicle and the second vehicle route to be programmed into a route guidance system of the second vehicle and/or cause the first and second vehicles to begin driving the first and second vehicles routes, respectively, under autonomous control.

The instructions, when executed by the processor, may cause the processor to, if a vehicle delivering the plurality of items according to a given delivery route is unable to delivery one item of the plurality: re-calculate the value of the first vehicle parameter for the given delivery route based on the mass of the item that the vehicle is unable to deliver, determine a location of a depot at which the vehicle is able to drop off the item it is unable to deliver, and calculate the value of the first vehicle parameter for a further delivery route being a route to stop at the depot, then the respective delivery destination of all undelivered items, and determine which one of the given delivery route or further delivery route optimizes the first vehicle parameter, e.g. as described above in relation to the method.

The instructions, when executed by the processor, may cause the processor to, in response to a determination that the further delivery route optimizes the first vehicle parameter, cause the further delivery route to be programmed into a route guidance system of the vehicle.

The first vehicle parameter may be dependent on the mass of a vehicle configured to transport at least one of (e.g. all of) the plurality of items.

According to another example of the present disclosure, there is provided a controller for a vehicle and for optimizing the delivery of a plurality of items to a plurality of delivery destinations, the plurality of items comprising a first item deliverable to a first delivery destination and a second item deliverable to a second delivery destination, the controller is configured to perform the method as described above and/or implement the instructions as described above. For example, the controller is configured to calculate the value of a first vehicle parameter, the first vehicle parameter being dependent on a mass of the first item and a mass of the second item, for a first delivery route, the first delivery route being a route to stop at the first delivery destination before the second delivery destination to thereby deliver the first item before the second, and a second delivery route, the second delivery route being a route to stop at the second delivery destination before the first delivery destination to thereby deliver the second item before the first, to thereby determine a delivery route that comprises the first and second delivery destinations that optimizes (e.g. maximize or minimize, depending on the first vehicle parameter) the value of the first vehicle parameter. The first and second routes may be as described above in relation to the method and instructions.

The controller may be configured to program the delivery route having the optimized first vehicle parameter into a route guidance system of the vehicle.

As described above, the vehicle parameter may comprise at least one of, e.g. one or more of: an amount of energy remaining in an energy store of the vehicle, an amount of energy consumed by the vehicle taking the delivery route, a top speed of the vehicle, a driving range of the vehicle, a driving time of the vehicle, a number of items deliverable by the delivery vehicle, a number of trips of the vehicle to deliver the items.

The controller may be configured to transmit a signal which, when received by a vehicle causes the vehicle to drive, following one of the first and second delivery routes (e.g. whichever one of the first and delivery routes optimizes the first vehicle parameter), under autonomous control.

The controller may be configured to transmit a signal which, when received by a fleet management module, causes the fleet management module to transmit instructions to at least one vehicle in a fleet of vehicles to drive, following one of the first and second delivery routes (e.g. whichever one of the first and delivery routes optimizes the first vehicle parameter), under autonomous control.

In response to an input describing a new destination, the controller may be configured to determine: a modified first delivery route, the modified first delivery route being a route to stop at the first delivery destination, then the new destination, then the second delivery destination, and/or a modified second delivery route, the modified second delivery route being a route to stop at the second delivery destination, then the new destination, then the first delivery destination, and to calculate the value of the first vehicle parameter for the first and second modified delivery routes (e.g. to thereby determine a modified delivery route that comprises the first and second delivery destinations separated by the new destination that optimizes, e.g. maximize or minimize, depending on the first vehicle parameter, the value of the first vehicle parameter). The modified delivery routes may be as discussed above in relation to the method and instructions.

The modified first delivery route may comprise a route that stops at the first delivery destination, then the new destination, then the second delivery destination, and optimizes the value of the first vehicle parameter. The modified second delivery route may comprise a route that stops at the second delivery destination, then the new destination, then the first delivery destination, and optimizes the value of the first vehicle parameter. The first vehicle parameter may be user-selectable and/or user-adjustable.

The controller may be for optimizing the delivery of N items (with N>3) to a plurality of delivery destinations, each one of the N items being deliverable to a delivery destination, and wherein the controller is configured to calculate the value of the first vehicle parameter, for a plurality of delivery routes, each delivery route being a route to stop at the respective delivery destinations for a subset M items (with M<N), wherein each route stops at the respective delivery destinations for each of the subset M items in a different order. Each route may stop at the respective delivery destinations for the subset M items in a different order. The M items may be as discussed above in relation to the method and instructions.

Each delivery route in the plurality of delivery routes may optimize the first vehicle parameter. The controller may thereby determine which route in the plurality of delivery route optimizes the first vehicle parameter. Each delivery route in the plurality of delivery routes may stop at the respective delivery destinations for the N items.

The controller may be configured to determine whether there exists a delivery route such that a first vehicle can deliver each item to its respective delivery destination, without stopping to refuel, such that the value of the first parameter is optimized.

If the controller determines that no delivery route exists such that the first vehicle can deliver each item to its respective destination without refueling, the controller may be configured to calculate the value of the first vehicle parameter for: a composite route for the first vehicle to deliver each item to its respective delivery destinations in two sub-routes, stopping to refuel in between the two sub-routes, and the sum of a first vehicle route and a second vehicle route, the first vehicle route being a route for a first vehicle to deliver a first subset of the plurality of items to their respective delivery destinations in one trip without refueling, and the second vehicle route being a route for a second vehicle to deliver a second subset of the plurality of items, the second subset comprising the remaining items, to their respective destinations in one trip without refueling, for example as discussed above in relation to the method and instructions.

The composite route may be a route for the first vehicle to deliver each item to its respective delivery destination is two sub-routes, stopping to refuel in between the two sub-routes, the composite route also optimizing the value of the first performance parameter.

The first vehicle route may be a route for a first vehicle to deliver a first subset of the plurality of items to their respective delivery destinations in one trip without refueling and also optimizes the value of the first vehicle parameter. The second vehicle route may be a route for a second vehicle to deliver a second subset of the plurality of items and also optimizes the value of the first vehicle parameter.

If the controller determines that no delivery route exists such that the first vehicle can deliver each item to its respective destination without refueling, the controller may thereby determine which of the composite route and sum of the first and second vehicle routes optimizes the value of the first vehicle parameter.

If the value of the first vehicle parameter is lower for the composite route then the controller may be configured to transmit a signal to the first vehicle which, when received by the vehicle causes the composite route to be programmed into a route guidance system of the first vehicle and/or causes the first vehicle to begin driving the composite route, under autonomous control, and wherein, if the value of the first vehicle parameter is lower for the sum of the first and second vehicle routes, then the controller may be configured to transmit a signal to a fleet management module to cause the fleet management module to cause the first vehicle route to be programmed into a route guidance system of the first vehicle and the second vehicle route to be programmed into a route guidance system of the second vehicle and/or cause the first and second vehicles to begin driving the first and second vehicles routes, respectively, under autonomous control.

If a vehicle delivering the plurality of items according to a given delivery route is unable to deliver one item of the plurality, then the controller may be configured to: re-calculate the value of the first vehicle parameter for the given delivery route based on the mass of the item that the vehicle is unable to deliver, determine a location of a depot at which the vehicle is able to drop off the item it is unable to deliver, and calculate the value of the first vehicle parameter for a further delivery route being a route to stop at the depot, then the respective delivery destination of all remaining items, to determine which one of the given delivery route or further delivery route optimizes the first vehicle parameter, for example as discussed above in relation to the method and instructions.

If the controller determines that the further delivery route optimizes the first vehicle parameter then the controller may be configured to cause the further delivery route to be programmed into a route guidance system of the vehicle.

The first vehicle parameter may also be dependent on the mass of a vehicle configured to transport at least one of the items.

According to another example of the present disclosure, there is provided a method for delivery of a plurality i items i delivery destinations. Each of the i items may be associated with a mass; the first item having a first mass, the second item having a second mass . . . the ith item has an ith mass. Similarly, each of the i items is deliverable to a delivery destination; the first item may be deliverable to a first delivery destination, the second item may be deliverable to a second delivery destination, the ith item may be deliverable to an ith delivery destination.

The method may comprise determining all of the possible sequences in which the i items are deliverable, e.g. 1, 2 . . . i; 2, 1 . . . i; i, 1 . . . 2, etc. The number of possible sequences may be equal to i! (i factorial) sequences.

The method may comprise, for each possible sequence, determining a route between each of the delivery destinations (i.e. a route for each leg) in the sequence according to a number of vehicle, item, and/or environmental parameters which it may be desirable to optimize.

The method may comprise determining a delivery route for each possible sequence, e.g. by joining together the delivery route for each leg of each possible sequence. For each leg of each delivery route, a value of a first vehicle parameter may be determined.

For each delivery route the value of a first vehicle parameter may be calculated. The first vehicle parameter may be dependent upon the mass of each of the i items. The first vehicle parameter may be dependent upon other factors, such as the distance between consecutive delivery destinations and/or the origin in each sequence, the mass of the items being transported by the vehicle between delivery destinations, a mass of the vehicle and/or environmental factors. The value of the first vehicle parameter for each delivery route may be the sum of the first vehicle parameter values for each leg of the delivery route. The method may thereby determine a delivery route comprising the i delivery destinations that optimizes the value of the first vehicle parameter.

For a better understanding of the present disclosure, and to illustrate how certain examples may be put into effect, examples will now be described with reference to the accompanying drawings in which:

DETAILED DESCRIPTION

Figure 1A:
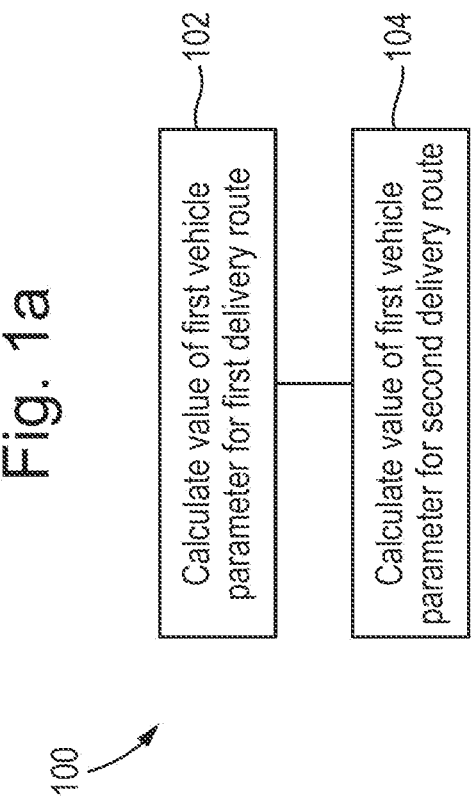
FIG. 1A is a flowchart showing the method of the present invention.

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

The vehicle in the examples that follow is depicted as a van but the principles of this disclosure hold for any type of vehicle, such as a motor vehicle (e.g. car, van, truck, motorcycle etc.), industrial or agricultural vehicles (e.g. tractor, forklift, bulldozer, excavator etc.), marine vessel, aircraft (e.g. commercial aircraft used in the transport of freight and/or passengers) watercraft, heavy goods vehicles, and freight trains etc.

Vehicles are often used to transport items from one location to another. A single vehicle may be used to transport a plurality of items from a single location (e.g. an origin or delivery depot) to a plurality of destinations. Additionally or alternatively, a single vehicle may be used to transport a plurality of items from a plurality of locations to a plurality of destinations (e.g. collect a plurality of items from a plurality of locations, the items subsequently being delivered to a plurality of delivery destinations). Additionally or alternatively further still, a vehicle may be used to collect at least one item from a pick-up location whilst performing a delivery route to deliver a plurality of items to a plurality of destinations. For conciseness, the present invention will be described in the context of a delivery method for delivering a plurality of items from a single location to a plurality of delivery destinations. However, as will be understood by the skilled person, the present disclosure may equally be applied to the delivery of items from a plurality of locations to a plurality of destinations and/or the collection of items from a plurality of locations to a single destination and/or other variants and permutations, such as the simultaneous delivery and collection of a plurality of items to/from a plurality of delivery and pick-up destinations. In examples where multiple items are to be transported to/from one location/destination, those multiple items may be considered to constitute a single item for the purposes of the present disclosure.

The items being transported may comprise items of cargo, such as parcels, packages and/or freight, e.g. for commercial delivery purposes or otherwise. Additionally or alternatively, the items may comprise passengers (e.g. people or animals), whether for commercial transport purposes, e.g. in a taxi or a ride-sharing service, or for non-commercial purposes, such as for a busy parent having multiple children. Accordingly, the term "item" when used in the present disclosure should be understood to include at least the above articles.

FIG. 1a shows a method 100 for optimizing the delivery of a plurality of items to a plurality of destinations. The method may comprise a computer-implemented method. The method 100 comprises calculating 102, e.g. by a processor, for a first delivery route a value of a first vehicle parameter, and calculating 104, e.g. by a processor, for a second delivery route the first vehicle parameter, such that a delivery route comprising the first and second delivery destinations and optimizes the value of the first vehicle parameter is determined.

If the first vehicle parameter comprises (e.g. is or is a function solely or at least partially dependent upon) the amount of energy consumed by the vehicle in taking a delivery route, then the delivery route having the lowest value of the total amount of energy consumed by the vehicle in taking that route may be determined as the delivery route comprising the first and second delivery destinations that optimizes the value of the first vehicle parameter. If the first vehicle parameter comprises (e.g. is or is a function solely or at least partially dependent upon) the amount of energy remaining in an energy store of the vehicle, then the delivery route having the highest value of the total amount of energy remaining in an energy store of the vehicle in taking that route may be determined as the delivery route comprising the first and second delivery destinations that optimizes the value of the first vehicle parameter. In other words, the vehicle parameter may be optimized by the first and second delivery routes and the method 100 may comprise a method of determining which of the first and second delivery routes optimizes the vehicle parameter. Optimizing may comprise maximizing or minimizing, depending on the parameter.

The method 100 therefore comprises calculating the value of the first vehicle parameter for the first delivery route and calculating the value of the first vehicle parameter for the second delivery route, the method thereby being capable of determining a delivery route that comprises the first and second delivery destinations that optimizes the value of the first vehicle parameter.

The first vehicle parameter be any vehicle parameter that it is desirable to optimize and that is dependent on the mass of the vehicle to transport the items, e.g. dependent upon the mas of the items. For example the first vehicle parameter may comprise at least one of: an amount of energy consumed by the vehicle in taking the delivery route; an amount of energy remaining in an energy store of the vehicle; an amount of pollution emitted by the vehicle; a fuel consumption of the vehicle; a top speed of the vehicle; a driving range of the vehicle; a driving time of the vehicle; a number of items deliverable by the vehicle; and a number of trips needed for the vehicle to deliver the items.

Figure 1B:
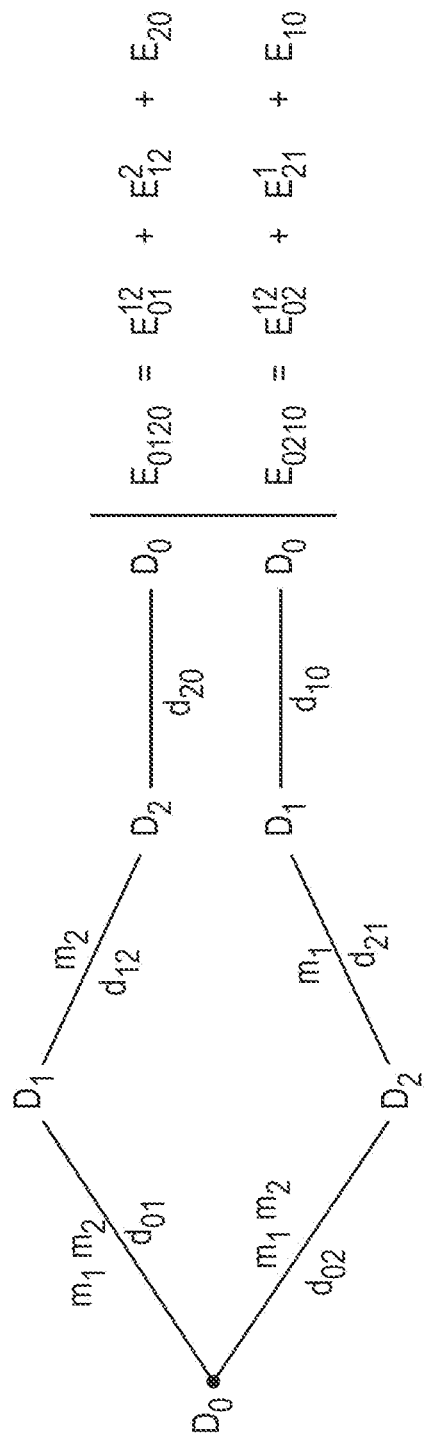
FIG. 1B is a decision tree of an example method for two items.

FIG. 1b schematically shows an example process, following which the method may calculate the value of the first vehicle parameter for the first and second delivery routes in order to determine which of the first and second delivery routes optimizes the parameter. FIG. 1b effectively shows a decision tree representing the possible ways of delivering a first item and a second item from an origin $D_0$ to a first delivery destination $D_1$ (the first delivery destination being the delivery destination of the first item) and a second delivery destination $D_2$ (the second delivery destination being the delivery destination of the second item) respectively. The first item has a first mass m1, and the second item has a second mass m2.

The decision tree comprises a number of lines, having a destination D at either end. Each line segment represents a leg of a route between the destinations at either end of each line. A lowercase d, having two subscript numbers, and shown below each line, denotes a distance travelled by the vehicle from the location of the first subscript number to the location of the second subscript number. For example $d_{01}$ denotes the distance between the origin $D_0$ to the first delivery destination $D_1$, and $d_{21}$ denotes the distance from the second delivery destination $D_2$ to the first delivery destination $D_1$, etc. The masses $m_1$, $m_2$ above each line illustrate the items being transported by the vehicle in travelling the leg between the destinations at either end of the line, and therefore the extra mass being transported in the vehicle between destinations.

As will be discussed later, the distance $d_{01}$ may be a direct straight line distance (e.g. as the crow flies) between the origin and first delivery destination $D_1$, that itself optimizes a parameter (e.g. shortest driving distance), for example the optimized parameter may comprise the first parameter.

It will be appreciated that the tree of FIG. 1b represents the total number of possible optimized routes in which the items can be delivered. In this case, for two items we have two optimized routes—a first (upper tree line) to deliver item 1 before item 2, and a second (lower tree line) to deliver item 2 before item 1 (in each case the route finishing at the start, or origin, of the route). In general, for N items, the number of possible optimized routes will be equal to N! (N factorial), where N is the number of items to be delivered.

The decision tree in FIG. 1b represents the calculation, performed by the method (or a processor acting on instructions or a controller, as will be explained below) of the vehicle parameter for the routes to deliver the first and second items. Starting from the origin $D_0$, the decision tree splits into two branches; the upper branch representing delivery of the first item first, and the lower branch representing the delivery of the second item first.

The upper branch of the decision therefore represents the first delivery route, in which the vehicle stops at the first delivery destination $D_1$ before the second delivery destination $D_2$ to thereby deliver the first item before the second. Similarly, the lower branch of the decision tree represents the second delivery route, in which the vehicle stops at the second delivery destination $D_2$ before the first delivery destination $D_1$ to thereby deliver the second item before the first item.

For the first leg of each of the first and second delivery routes, the vehicle is transporting both the first item and the second item, from the origin $D_0$ to the respective delivery destination ($D_1$ or $D_2$) and, as such, the vehicle mass includes the masses of the first and second items, $m_1$ and $m_2$ (as denoted above each line). More specifically, for the first leg of the first delivery route, the vehicle travels distance $d_{01}$ from the origin to the first delivery destination $D_1$, and, for the first leg of the second delivery route, the vehicle travels distance $d_{02}$ from the origin to the second delivery destination $D_2$. In each case, the vehicle transports the first and second items and therefore the mass of the vehicle includes the masses m1 and m2.

Upon completing the first leg of either of the first or second delivery routes, and thus reaching the first or second delivery destinations, the respective item is delivered (item 1 for the first delivery route, item 2 for the second). Accordingly for the first delivery route, once the first item is delivered, the first item is no longer being held by the vehicle whose mass is therefore lighter by m1 and, for the second delivery route, once the second item is delivered, the second item is no longer being held by the vehicle whose mass is therefore lighter by $m_2$.

For each route, the vehicle is then to deliver the remaining, undelivered, item. Accordingly, for the second leg of the first delivery route, the vehicle must then travel from the first delivery destination $D_1$ to the second delivery destination $D_2$, travelling a distance $d_{12}$. In this leg, the vehicle's mass includes the second mass $m_2$. Similarly, for the second leg of the second delivery route, the vehicle must then travel from the second delivery destination $D_2$ to the first delivery destination $D_1$, travelling a distance $d_{21}$. In this leg, the vehicle's mass includes the first mass $m_1$.

Upon reaching the remaining delivery destination, the remaining item is delivered (item 2 for the first delivery route, item 1 for the second). As such, from then on, the vehicle's mass does not include the first or second masses.

Thereafter, for each route, the vehicle returns to the origin, for example in order to commence another delivery route. In some examples, the third leg, in which the delivery vehicle returns to the origin $D_0$, may not be present. In these examples, each of the first and second delivery routes do not comprise the route origin but end upon completion of the delivery of the final item (or, more specifically, end upon reaching the destination of the final item to be delivered). Alternatively, in some examples, after delivering the final item the vehicle may travel to a different delivery depot, for example a closest delivery depot rather than the origin delivery depot, such that a vehicle may not return to its origin delivery depot after performing each delivery route. In some examples, after delivering the final item the vehicle may travel to a new destination entirely, or remain at its location.

According to the method 100, for each delivery route, a value of a first vehicle parameter may be calculated. The first vehicle parameter is dependent on (e.g. a function of) the mass of the first item, m1, and the mass of the second item, m2. The first vehicle parameter is denoted in FIG. 1b by the letter E having two subscript numbers, with $E_{01}$ denoting the value of the first vehicle parameter in travelling from the origin $D_0$ to the first delivery destination $D_1$, etc. The numbers superscript to the letter E denote which items (and therefore masses) are being transported for that journey. For example, $E_{01}^{12}$ denotes the value of the first parameter for a journey from $D_0$ to $D_1$ transporting the first and second items (and therefore the masses of the first and second items).

The first vehicle parameter may correspond to any vehicle parameter that is desirable to optimize. For example, and as mentioned above, the first vehicle parameter may comprise at least one of: an amount of energy consumed by the vehicle in taking the delivery route; an amount of energy remaining in an energy store of the vehicle; an amount of pollution emitted by the vehicle; a fuel consumption of the vehicle; a top speed of the vehicle; a driving range of the vehicle; a driving time of the vehicle; a number of items deliverable by the vehicle; and a number of trips needed for the vehicle to deliver the items.

For each of the first and second delivery routes, a total value of a first vehicle parameter is calculated. In FIG. 1b, this is shown at the end of each branch, denoted by the letter E having four subscript numbers that indicate the delivery route taken. For example, the first deliver route (to deliver the first item before the second) comprises a route segment from the origin for the first delivery destination, $d_{01}$, a route segment from the first delivery destination to the second delivery destination, $d_{12}$, and a route segment from the second deliver destination to the origin $d_{20}$. As mentioned above, the masses that the vehicle transports are different from each segment. The value of the first parameter for the first route is the sum of the value of the parameter for each route segment. In the case of the first route segment, the value of the first parameter is the sum of $E_{0112}$ (being the first vehicle parameter to transport the first and second items from the origin to the first delivery destination), $E_{122}$ (being the value of the first vehicle parameter to transport the second mass from the first delivery destination to the second delivery destination), and $E_{20}$ (being the value of the first vehicle parameter to travel from the second delivery destination back to the origin). The sum of these vehicle parameters is denoted in FIG. 1b as $E_{0120}$ (the subscripts here denoting the route travelled). Similarly for the second route, where the first vehicle parameter for the second route, $E_{0210}$, is the sum of $E_{0212}$, $E_{211}$ and $E_1$. Step 102 of the method 100, in the case where the method 100 comprises a method of delivery two items to two respective delivery destinations, may therefore comprise determining $E_{1202}$, and step 104 of the method 100 may comprise determining $E_{0210}$.

Figure 2:
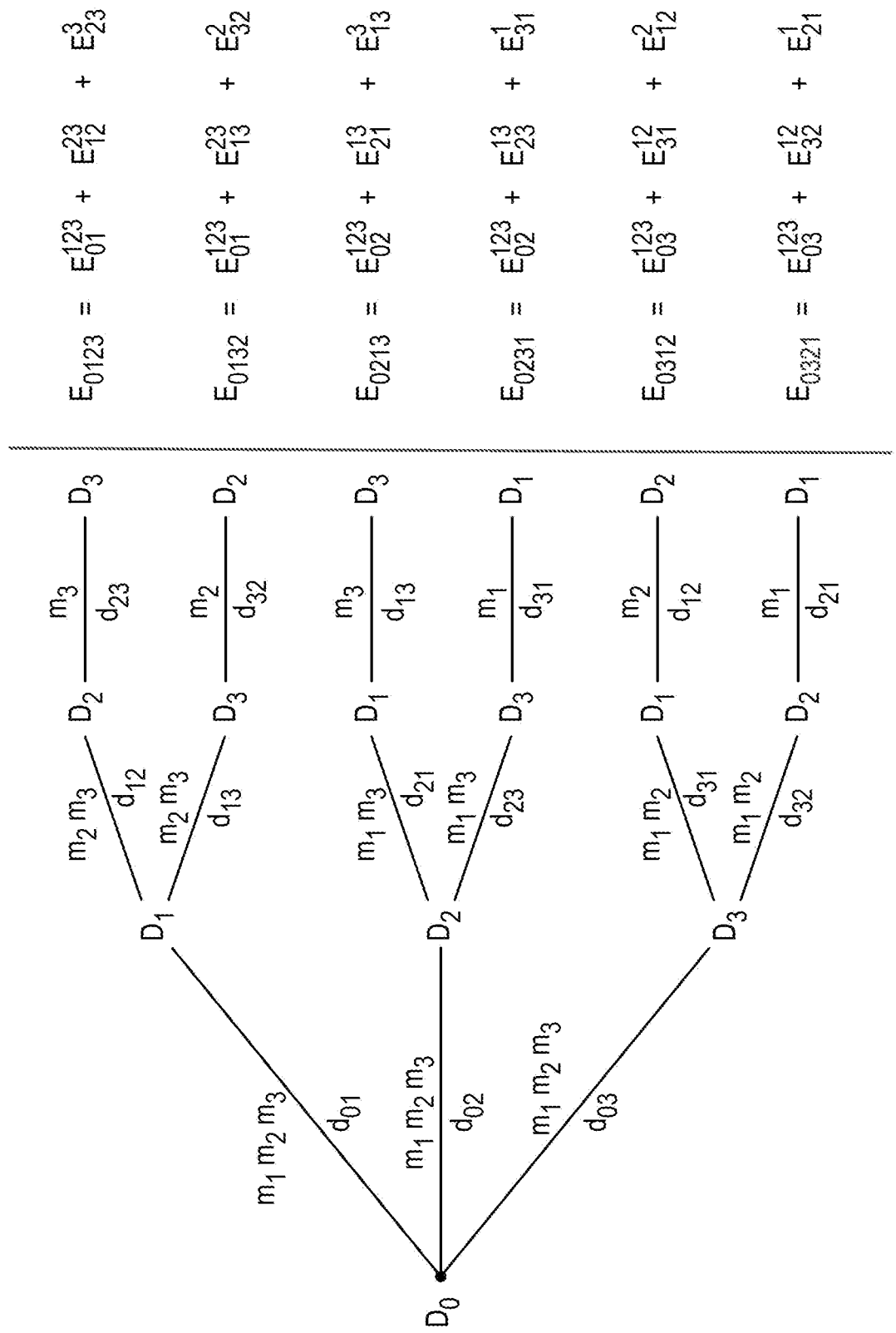
FIG. 2 is a decision tree of an example method for three items.

FIG. 2 shows the decision tree in the example of delivering of a first item, a second item and a third item from an origin $D_0$ to a three respective delivery destinations $D_0$, $D_2$ and $D_3$. The first item has a mass m1, the second item has a mass m2, and the third item has a mass m3. The decision tree shown in FIG. 2 illustrates the level of computation performed by the method 100, in one example, to calculate various delivery routes to deliver the three items, to determine which delivery route optimizes the parameter. Accordingly, the same notation and symbols are used in FIG. 2 as in FIG. 1b.

The method may comprise determining all of the possible sequences in which the first, second and third items can be delivered (any two of which may be considered the 'first' and 'second' routes of FIG. 1a, whose first parameter value is calculated at steps 102 and 104). Accordingly, for three items to be delivered to three delivery destinations, the possible routes (e.g. orders to deliver the items) are 1,2,3; 1,3,2; 2,1,3; 2,3,1; 3,1,2 and 3,2,1, e.g. 3! (three factorial), i.e. 6, sequences.

Accordingly, starting from the origin $D_0$, the decision tree splits into three initial branches; an upper branch representing a route according to which the first item is delivered first, a middle branch representing a route according to which the second item is delivered first, and a lower branch representing a route according to which the third item is delivered first. In the example of FIG. 2 each route does not terminate at the origin D0.

As described above for FIG. 1b (and which will not be repeated here for brevity), for each of the six routes there is a value of the first vehicle parameter. These are each comprised of the sum of the value for the first vehicle parameter for each sub-route of each route. For example, for the route in which delivers the items in the order 2-3-1 (the fourth tree branch), this route comprises a route from the origin to the second destination (where the vehicle transports all three items), a route from the second destination to the third destination (where the vehicle transports items 1 and 3) and a route from the third destination to the first destination (where the vehicle transports item 1). The vehicle parameter for this route is denoted $E_{0231}$ and comprises the sum of the vehicle parameters for each sub-route, e.g. $E_{02123}$, $E_{2313}$, and $E_{311}$.

Therefore, as with the example shown in FIG. 1b, the method 100 may comprise calculating a value of a first vehicle parameter for each leg of each delivery route, as shown at the end of each delivery route. The method may comprise calculating the total value of a first vehicle parameter for each of the delivery routes. The total value of the first vehicle parameter for each of the delivery routes may be the sum of the first vehicle parameter for each leg of each delivery route, or sub-route.

Accordingly, the method may thereby determine the delivery route comprising the delivery destinations of all of the items that optimizes the value of the first vehicle parameter.

Thereafter, a user determine the delivery route being the route having the optimized parameter (this may be highest or lowest depending on the type of parameter), or the optimized route may be automatically programmed into a route-guidance system of a vehicle.

As stated above, the first vehicle parameter is dependent on the masses of the items. For example, the mileage of a vehicle, its top speed, fuel efficiency e.g. will depend on how much mass the vehicle is moving, and therefore these values change with each additional item of cargo that is loaded into the vehicle. It will also depend on the base mass of the vehicle (e.g. when empty) and the mass of any occupants such as the driver or any passengers.

Figure 3:
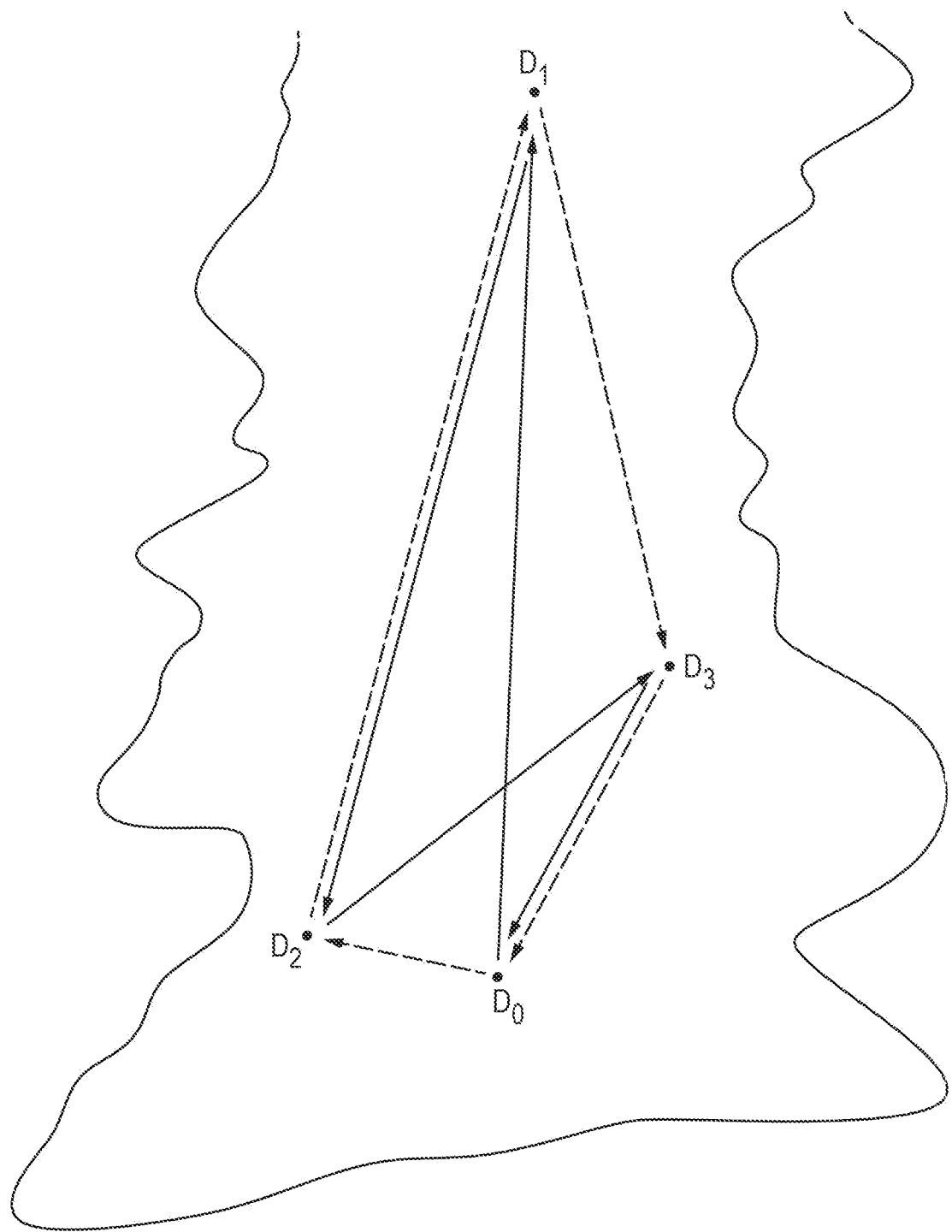
FIG. 3 is a schematic representation of an example delivery route for three items.

FIG. 3 schematically shows an example of the present disclosure where three items are to be delivered to three respective delivery destinations $D_1$, $D_2$ and $D_3$ respectively, from a delivery depot Do. FIG. 3 shows an example geography comprising all four locations.

According to this example, $D_2$, the destination of the second item, is closest to the origin and $D_1$, the destination of the first item, is farthest away. Some methods for optimizing routes between multiple locations may seek to minimize the total distance travelled. One route according to such a method is shown by the dotted lines in FIG. 3, indicating a route starting from the origin $D_0$, travelling first to delivery destination $D_2$, then $D_1$, then $D_3$ before finally returning to the origin, and which, in this example, minimizes the total distance travelled by the delivery vehicle in completing the three deliveries. However, such a route may not optimize a value that is dependent on the vehicle's mass, e.g. the first vehicle parameter.

According to the method of FIG. 1a however, the mass of each item being delivered is taken account to determine a delivery route that optimizes the first vehicle parameter. In this example, the first item has a mass m1 which is significantly higher than the mass of the second item $m_2$, and the third item has a mass $m_3$ significantly lower than mass of the first and second items, e.g. $m_1 \gg m_2 \gg m_3$.

In this example, according to the method of FIG. 1a, an optimized delivery route may be calculated (for example, the value of a first vehicle parameter is calculated for a number of routes, such as the six routes shown by branches in FIG. 2.

In this example, the method 100 may determine that the uppermost branch in FIG. 2, corresponding to the delivery sequence 1, 2, 3 optimizes the value of the first performance parameter Accordingly, a delivery route that delivers the items in the sequence 1, 2, 3 is determined as being the optimal route. This route is shown in FIG. 3 with solid lines. The present method thereby determines a delivery route comprising the delivery destinations of the items being delivered that optimizes the value of the first vehicle parameter. In this example, although the first delivery destination is the farthest away, the calculated route is to visit this destination first due to the higher mass of the first item relative to the others, and therefore vehicle parameters dependent on expended energy or emissions will be lower for a route that visits this destination first, effectively delivering the heaviest item first so that the remainder of the delivery route can be performed by the vehicle when at a lighter mass. By contrast, a route that delivered the first item last would have the vehicle operating at a higher mass ($m_1$ being significantly larger than $m_2$ and $m_3$) and therefore would increase energy expenditure and emissions.

Figure 4:
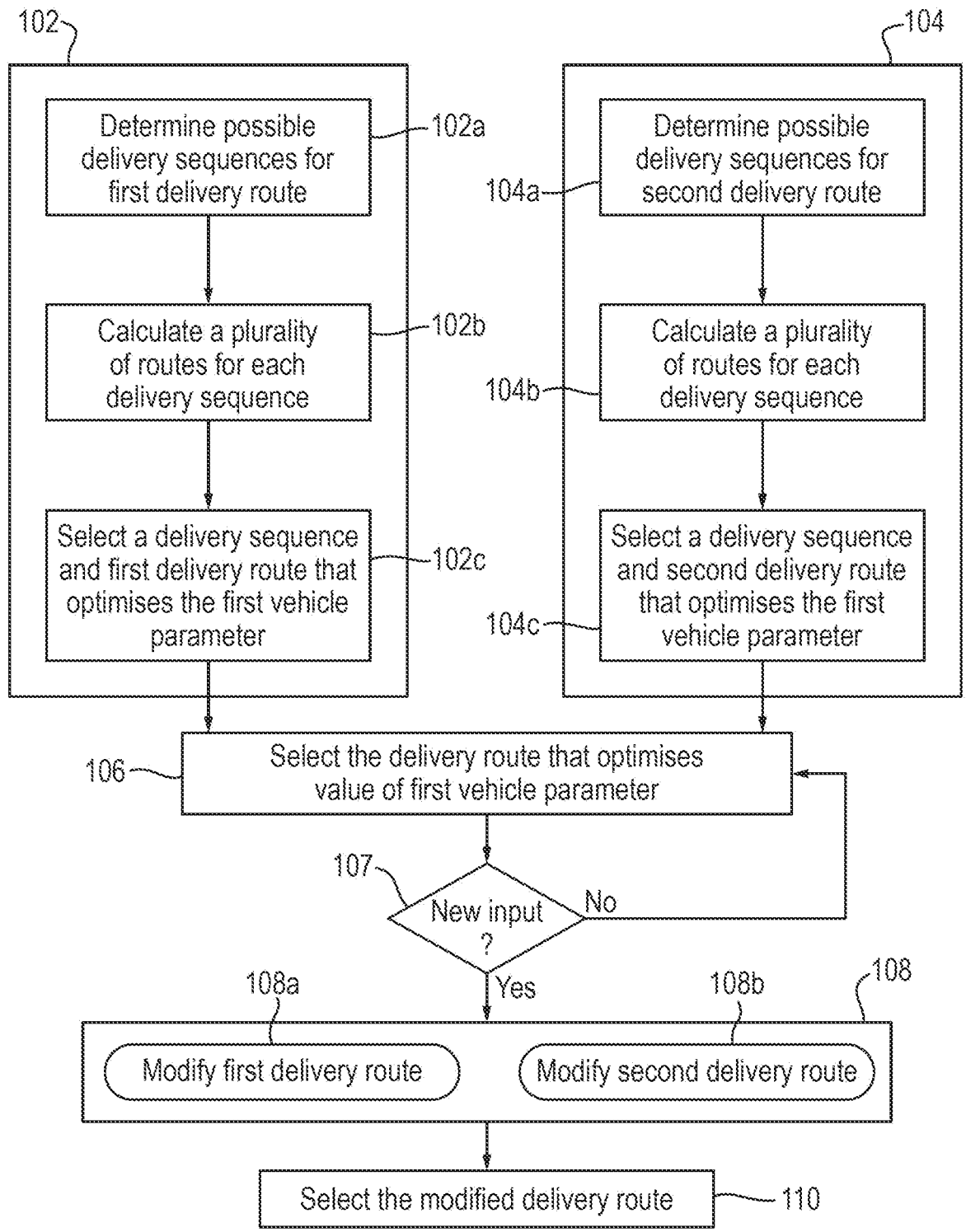
FIG. 4 is a flow chart showing one example of the method of the present invention.

FIG. 4 shows an example method comprising a number of steps. The method 100 may comprise the steps as set out in FIG. 4. The step 102 (e.g. of the method 100) of calculating the value of the first vehicle parameter for the first delivery route may comprise determining 102a, e.g. by a processor, possible first delivery sequences for the first delivery route, calculating 102b, e.g. by a processor, a plurality of routes for each first delivery sequence, and/or selecting 102c, e.g. by a processor, a first delivery sequence and a first delivery route that optimizes the first vehicle parameter. Similarly, the step 104 of calculating the value of the first vehicle parameter for the second delivery route may comprise determining 104a, e.g. by a processor, possible second delivery sequences for the second delivery route, calculating 104b, by a processor, a plurality of routes for each second delivery sequence, and/or selecting 104c, e.g. by a processor, a second delivery sequence and a second delivery route that optimizes the first vehicle parameter. In this way, the first delivery route and second delivery route (in the steps 102 and 104 of the method 100 of FIG. 1a) may each be a route that itself optimizes the first parameter. In other words, the method 100 may comprise a method of determining which one, of two or more, delivery routes that themselves are optimal in some way, is the most optimal. In other words, the method may comprise a method of determining the best possible delivery route from two or more (already) optimal delivery routes.

The method 100 may further comprise selecting 106, e.g. by a processor, the delivery route (from the first and second delivery routes) that optimizes the value of the first vehicle parameter.

In response to an input describing a new destination, as represented by steps 106 and 107, the method 100 may comprise modifying, at step 108, e.g. by a processor, the first delivery route (step 108a) to derive a modified first delivery route, the modified first delivery route being a route to stop at the first delivery destination, then the new destination, then the second delivery destination; and/or modifying the second delivery route (step 108b) to derive a modified second delivery route, the modified second delivery route being a route to stop at the second delivery destination, then the new destination, then the first delivery destination. The method 100 may comprise calculating (not shown) the value of the first vehicle parameter for the first and second modified delivery routes. The method 100 may comprise selecting, at step 110, e.g. by a processor, the modified delivery route having the optimized first vehicle parameter. Selecting the modified delivery route, at 110, may comprise causing the selected delivery route to be programmed into a route guidance system of a vehicle. As indicated by the looping arrow from step 107, if there is no new input, then the method 100 may not comprise steps 108a, 108b and 110. In this example, therefore, the method is capable of responding to a new input by adjusting the available routes and then choosing the adjusted route that is the most optimum. For example, if an operator wishes to stop, e.g. for lunch, and adds a new input (in the form of a new destination) then the method (at step 108) modifies the first and second delivery routes to include the new destination and then chooses (step 110) which modified delivery route optimizes the first vehicle parameter. It may be that the first delivery route optimizes the first vehicle parameter when compared to the second delivery route but that the second modified delivery route optimizes the parameter when compared to the first modified delivery route. In other words, a different route may become the more optimal route when a new input is taken into account.

Figure 5:
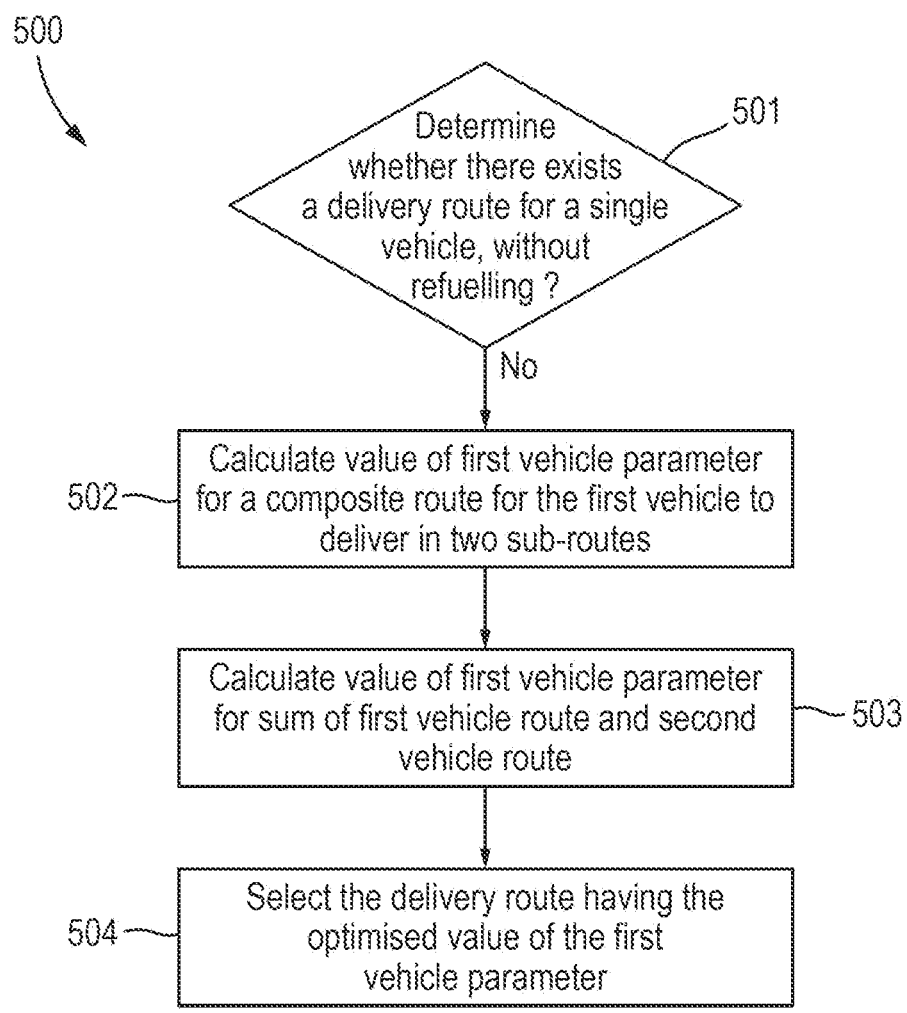
FIG. 5 is a flow chart showing one example of the method of the present invention.

FIG. 5 shows an example method 500, which may comprise a computer-implemented method. The method 100 may comprise the method 500. The method comprises steps 501-504 each of which may be performed by a processor. The method comprises determining 501 whether there exists a delivery route such that a first vehicle can deliver each item to its respective delivery destination, without stopping to refuel, such that the value of the first vehicle parameter is optimized.

In response to a determination 501 that no such delivery route exists, the method 500 comprises calculating 502 the value of the first vehicle parameter for a composite route for the first vehicle to deliver each item to its respective delivery destinations in two sub-routes, stopping to refuel in between the two sub-routes, and calculating 503 the value of the first vehicle parameter for the sum of a first vehicle route and a second vehicle route, the first vehicle route being a route for the first vehicle to deliver a first subset of the plurality of items to their respective delivery destinations in one trip without refueling, and the second vehicle route being a route for the second deliver a second subset of the plurality of items, the second subset comprising the remaining items, to their respective destinations in one trip without refueling.

The method 100 may comprise selecting 504 the delivery route, out of the composite route and the sum of the first and second vehicle routes, having the optimized value of the first vehicle parameter. In other words, according to the method 500, it is able to be determined if it is the first vehicle parameter is optimized by using only one vehicle to deliver all the items in two trips (e.g. including a stop to re-fuel) or by splitting the items between two vehicles and using the two vehicles to deliver all the items.

Figure 6:
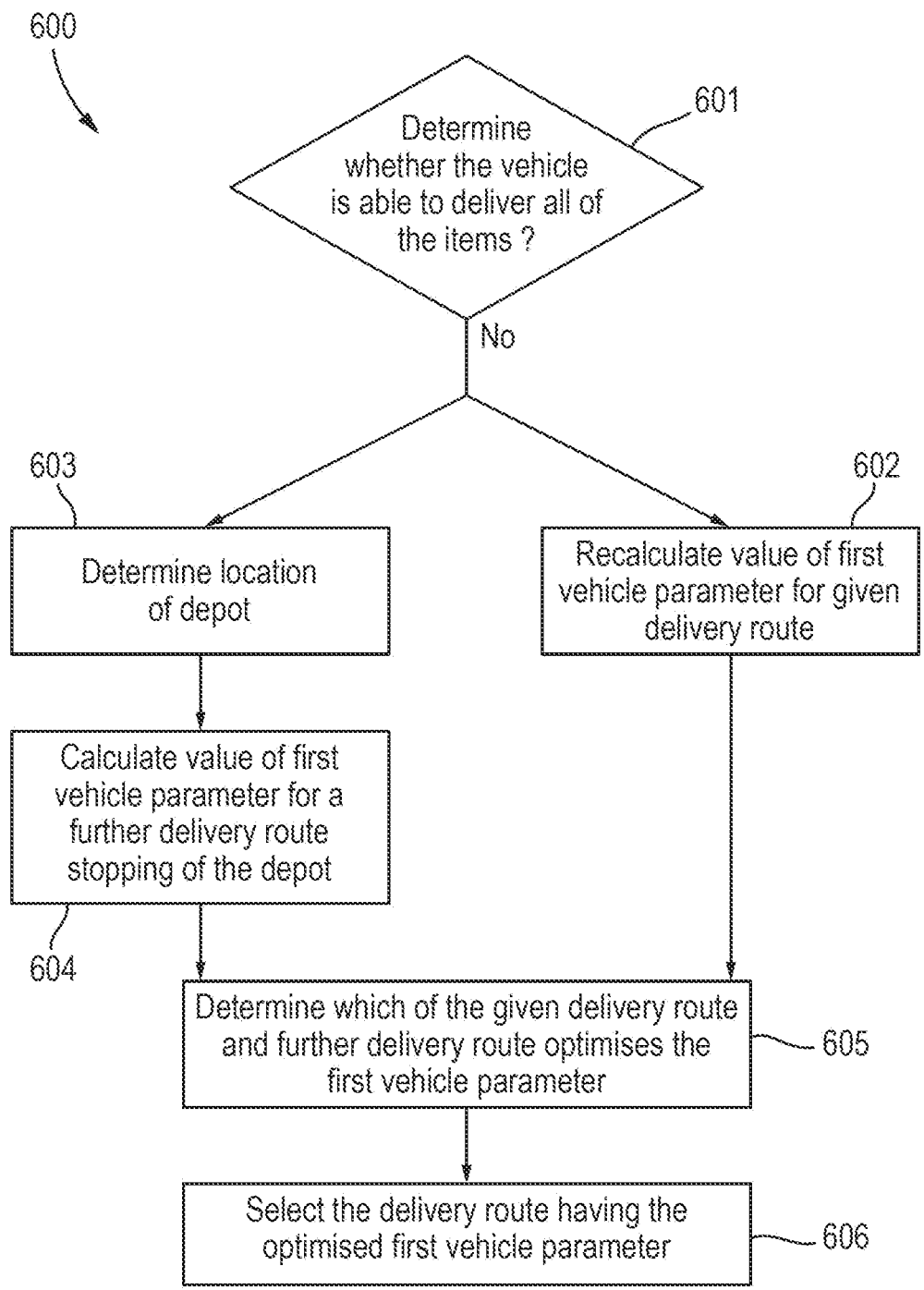
FIG. 6 is a flow chart showing one example of the method of the present invention.

FIG. 6 shows an example method 600. The method 600 may comprise a compute-implemented method. The method 100 may comprise the method 600. The method comprises steps 601-606 each of which may be performed by a processor. During performance of a given delivery route, it may occur that at least one item being delivered may not be deliverable, e.g. due to the absence of a recipient of the undeliverable item, cancellation of an order for the undeliverable item etc. Accordingly, the method 600 comprises determining 601 whether a vehicle performing a given delivery route is unable to deliver at least one (e.g. one) item.

In response to a determination 601 that the vehicle is unable to deliver an item, the method 600 comprises re-calculating 602 the value of the first vehicle parameter for the given delivery route based on the mass of the item that the vehicle is unable to deliver. The method may comprise determining 603 a location of a depot at which the vehicle is able to drop off the item it is unable to deliver, and calculating 604 the value of the first vehicle parameter for a further delivery route being a route to stop at the depot then continue to deliver the remaining items. The method comprises determining 605 which one of the given delivery route or further delivery route optimizes the first vehicle parameter. The method comprises selecting 606 the delivery route of the given delivery route or the further delivery route having the optimized first vehicle parameter. In this example, the method is able to respond to changes on-the-fly to its cargo, for example due an item being non-deliverable (e.g. due to the intended recipient not being home). In this example, the method is able to determine whether the first vehicle parameter is optimized by the vehicle completing its route (but carrying the additional weight of the undelivered item) or by dropping the item off at a nearby depot. It will be appreciated that if an item unable to be delivered is the heaviest item, by far, then it may optimize the first vehicle parameter (which is dependent on the mass of the cargo) to drop the item off as soon as possible. For example, the method may comprise determining an appropriate location for a hand-over of the undeliverable item to a further vehicle. The further vehicle may be configured to attempt re-delivery of the item. Additionally or alternatively, the further vehicle may be a vehicle approaching the end of its delivery route such that it may be the vehicle of a delivery vehicle fleet that is able to return the undeliverable item to a delivery depot (e.g. the item's origin depot) according to a delivery route that optimizes the value of the first vehicle parameter, e.g. for the whole fleet. In any case, the vehicle or further vehicle, upon receipt of the item, may perform any of the method steps as described above to determine a delivery route for the item that optimizes the chosen vehicle parameter.

Selecting the route, at either 504 or 606 may comprise causing the selected route to be programmed into a route guidance system of a vehicle.

A further example of the present disclosure will now be described, in general terms, in relation to the delivery of i items to j delivery destinations (with j being less than or equal to i). Each of the i items is associated with a mass; the first item has a first mass, the second item has a second mass ... the $i^{th}$ item has an $i^{th}$ mass. Similarly, each of the i items is deliverable to a delivery destination, and more than one item may be deliverable to the same delivery destination The method may comprise determining all of the possible sequences in which the i items are deliverable, and therefore may comprise determining the i! (i factorial) sequences in which the i items may be delivered. Each sequence in the i! sequences may itself be a sequence that optimizes the first vehicle parameter. In other words, there are potentially infinite sequences (routes) to deliver the i items in the order 1, 2, ..., i, but the sequence determined by the method may be the route to deliver the i items in the order 1, 2, ..., i, such that the first vehicle parameter (or indeed another parameter) is optimized.

The method may comprise, for each possible sequence, determining a route between each of the delivery destinations (i.e. a route for each leg) in the sequence according to a number of vehicle, item and/or environmental parameters which it may be desirable to optimize.

The route for each leg of each possible sequence may be joined together such that for each possible sequence a delivery route may be determined.

For each leg of each delivery route, a value of a first vehicle parameter may be determined.

For each delivery route the value of a first vehicle parameter is calculated. The first vehicle parameter is dependent upon the mass of each of the i items, and optionally also the mass of the vehicle without any items. The first vehicle parameter may be dependent upon other factors, such as the distance between consecutive delivery destinations and/or the origin in each sequence, the mass of the items being transported by the vehicle between delivery destinations, a mass of the vehicle and/or environmental factors. The value of the first vehicle parameter for each delivery route may be the sum of the first vehicle parameter values for each "leg" of the delivery route. The method thereby determines a delivery route comprising the i delivery destinations that optimizes the value of the first vehicle parameter.

As with the examples described in relation to FIGS. 1 and 2, it will be understood that upon reaching the delivery destination associated with each respective item, that item is delivered to its destination, and that item is then no longer transported by the vehicle (and the mass of the vehicle is therefore lighter by the mass of the delivered item). Accordingly, as the vehicle progresses along each delivery route, the total mass being transported decreases provided each item is able to be delivered. As the vehicle progresses along its delivery route, the vehicle therefore gets lighter.

Where a large number of items is to be delivered, such that the calculation of all the possible sequences is prohibitively resource-intensive, it may be desirable to determine an optimized delivery route for a subset of the items to be delivered, e.g. the heaviest subset, since the heavy items will affect the value of the first vehicle parameter more than the lighter ones. For example, given the nature of the factorial function which relates to the number of possible delivery sequences, it may be undesirable (e.g. computationally intensive) to determine all of the possible sequences for a large number of items. Accordingly, it may be desirable to optimize the delivery route for a subset of the total number of items to be delivered.

A subset M of the total number of items N may be a fraction of the total number of items N, e.g. 0.1 N, 0.25 N, 0.5 N, 0.75N, or alternatively may be limited to an absolute number of total number of items, e.g. M=5, 10, 50. The relationship between N and M may be dictated by the processing power of the means by which the routes are to be determined, or may be user selectable and/or adjustable.

As stated above, to determine which items are included in the subset M, items may be selected according to at least one parameter which has an effect on the first vehicle parameter. For example, the first vehicle parameter is dependent upon the mass of each item for which the delivery route is optimized, such that the subset M items may comprise the heaviest items according to the relationship between N and M. The heaviest items may be the heaviest proportion of items, e.g. the heaviest 5% of items, or alternatively the heaviest items may be an absolute number, such as the heaviest 5 items. Alternatively, the first vehicle parameter may be further dependent upon the deadline for delivery for each item, in which case the subset M items may comprise the items having high mass and a time-pressing delivery deadline.

In this way, a balance may be reached in the relationship between the subset M items for which the delivery route is optimized and the amount of processing power and time required in order to determine the optimized delivery routes.

It is increasingly common for a large number of vehicles to be used as part of a fleet to perform a delivery. For example, online retailers needing to distribute a very large number of items across a large geographic area are known to require a large fleet of vehicles in order to deliver a large number of items to their respective delivery destinations.

Accordingly, a delivery depot may be required to deliver a set of items to a plurality of delivery destinations. As such, prior to the steps relating to the determination of an optimized delivery route described above, the method may comprise the step of allocating a subset of the items to each delivery vehicle. The subset of items allocated to each vehicle may be determined according to at least one of: the mass of each item, the maximum mass transportable by each vehicle, the geographical proximity of each delivery destination to the delivery depot, the physical dimensions of each item and the interior of the delivery vehicle, the amount of energy currently stored within the energy store of each vehicle, the delivery deadline for each item and/or any combination of the above.

The method may thus comprise the step of allocating to a delivery vehicle a subset of items according to a geographic clustering of the subset when compared with the set of items. Subsequently, the method may comprise determining a subset comprising the heaviest items and determining an optimized delivery route for the subset—the heaviest subset may represent the heaviest items of the set, or the heaviest items of a subset.

The mass of each item may be determined at any of a number of stages during the transportation process. For example, the mass of each item may be determined prior to loading each item into or onto the vehicle. For example, each item may pass down a conveyor belt and over a weight plate where its mass may be determined. Alternatively, the vehicle may comprise a load cell, for example attached to the suspension of each wheel of the vehicle, the load cell thus determining the mass of the items as they are loaded successively onto the vehicle. As a further alternative, the vehicle may be parked on a weighing station during loading, such that the mass of each item is determined during the loading process. Further alternatives will be understood by the skilled person.

The distance $d_{01}$ may be a direct straight line distance (e.g. as the crow flies) between the origin and first delivery destination $D_1$, a function of that distance, or alternatively a distance according to a route calculated between the two locations according to a number of other parameters (e.g. vehicle parameters and environmental/geographical parameters)—e.g. the quickest route between two locations in terms of travel time, fuel economy, etc. The distance $d_{01}$ may be the distance travelled when following a leg of a route that optimizes the value of the first vehicle parameter (e.g. the route having the lowest energy consumption). The distance $d_{01}$ may be another distance in other examples, and may be user-settable, -selectable and/or user-adjustable. For example, a user may decide to view delivery routes that avoid a certain location and then compare which of these delivery routes (that avoid a certain location) optimize the first vehicle parameter.

The environment of the delivery destinations may be taken into account. For example, if the delivery destinations and delivery depot are located within a city having a regular (e.g. square) grid system, the city not prone to traffic or other time-dependent hindrances, then it may be useful to determine the straight line distance between two locations and then multiply this distance by a factor to account for the non-straight line nature of travel, e.g. 1.41. To the contrary, if the environment of the delivery destinations is very rural, having few roads, then the exact road route a vehicle would take in travelling between the two locations becomes relevant, such that a route (e.g. a shortest route) may be determined between the two locations when determining the distance therebetween. It will be understood that further factors, e.g. traffic, hills/gradients, weather, may be taken into account when determining the distance between locations and a route therebetween. When taking into account the traffic in determining a delivery route, the method may take into account the time of day, the likely duration of the traffic, the geographic extent of the traffic and/or the effects of the traffic on the energy consumption of the vehicle in performing the delivery route.

A number of item parameters may be taken into account when determining distances and routes between delivery destinations. For example, a delivery environment may comprise a delivery destination situated atop a steep hill, the hill having high winds and difficult road conditions. The method of the present disclosure may take into account the nature of the roads on the delivery route. Accordingly, with reference to the foregoing example, the method may determine a delivery route in which the mass of items being transported up the hill is considered when determining a delivery route, such that the mass being transported by the vehicle is reduced such that an optimized delivery route is determined.

A number of vehicle parameters may be taken into account when determining an optimized delivery route, such that a delivery route may determined such that a first vehicle parameter and a second vehicle parameter are optimized.

It will be appreciated that the distance $d_{01}$ may not necessarily be identical to the distance $d_{10}$ according to environmental parameters, such as traffic, one-way systems, hills/gradients etc.

Once an optimized delivery route has been determined by the present method, the method may further comprise programming, into a route guidance system of a vehicle, the delivery route having the optimized first vehicle parameter. The delivery route may comprise the delivery destinations of the items for which the delivery route has been optimized. For example, in the case where the route has been optimized for a subset of items of the total number of items, the delivery route may comprise the delivery destinations of each of the subset of items.

At present, delivery vehicles are driven by delivery drivers who may require a break from driving, e.g. for a lunch and/or convenience stop and/or in accordance with local law. Such a break may range in duration from a few minutes, up to several hours and beyond. As such, once a delivery route has been commenced, the driver may need to add a waypoint to the journey in order to facilitate such a break. Accordingly, in response to an input describing a new destination, e.g. a waypoint, the method may further comprise modifying the delivery routes (e.g. the delivery routes in which the items are delivered in all possible sequences and/or the first and second delivery routes) so as to include the new destination, and calculating the value of the first vehicle parameter for the modified delivery routes. As will be understood by the skilled person, the new destination may include a location that is suitable for waiting and/or parking, suitable for charging and/or re-fueling, and/or a location with a toilet etc.

It is preferable that a delivery vehicle is able to complete its delivery route without being required to refuel or recharge along the way. The method may thus comprise determining whether there exists a delivery route such that a first vehicle can deliver each item to its respective delivery destination without stopping to refuel such that the first parameter is optimized. If it is determined that no delivery route exists such that the first vehicle can deliver each item to its respective delivery destination without refueling, the method may further comprise dividing the delivery route. The delivery route may be divided into two sub-routes, a refueling and/or recharging station separating the two sub-routes. As such, the first vehicle may be able to complete the two sub-routes having refueled/recharged. A waypoint may thus be introduced to the delivery route, the waypoint being a location suitable for refueling/recharging and about which the delivery route may be divided into at least two sub-routes. Alternatively, the delivery route may be divided into two vehicle routes, each vehicle route to be completed by a different vehicle, e.g. simultaneously. Alternatively, the first vehicle may transport all of the items, delivering a first subset thereof, and upon reaching a hand-over location, the remaining items (a second subset) may be transferred to the second vehicle, which may have travelled to the hand-over location unladen. In this way, the items may be delivered in a manner in which the first vehicle parameter is optimized. As a further alternative, there may be no hand-over of items and the first and second vehicles may commence their deliveries from the delivery depot independently and/or simultaneously. A total value of a first vehicle parameter may be calculated for each of the above two options—the two sub-routes separated by a recharge/re-fuel, and the division into a first and a second vehicle delivery route. The method may thereby determine at least two delivery routes comprising the delivery destinations that optimizes the value of the first vehicle parameter.

It is anticipated that delivery vehicles in the future will become increasingly automated, such that (partially or fully) automated vehicles may become the norm in vehicle delivery. Accordingly, the method may further comprise transmitting a signal which, when received by a vehicle, causes the vehicle to drive following one of the delivery routes under autonomous control.

Figure 7:
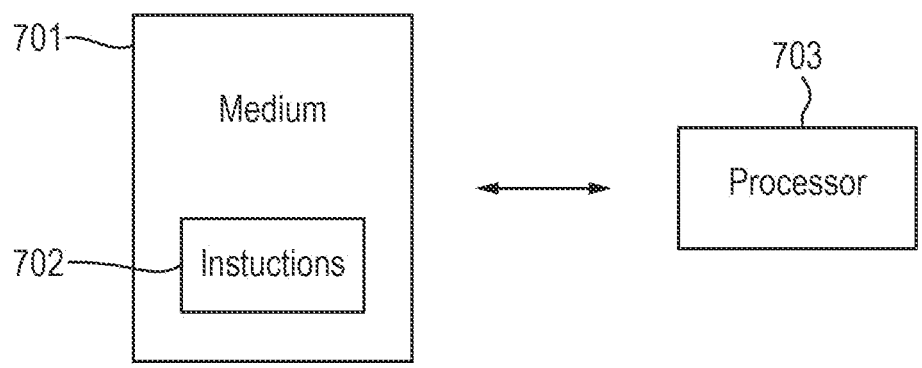
FIG. 7 is a schematic diagram of a machine-readable medium in association with a processor.

FIG. 7 shows a non-transitory machine-readable medium 701 comprising instructions 702 which, when executed by a processor 703, cause the processor 703 to perform the methods of the present disclosure as described above (e.g. with reference to FIG. 1-6).

Figure 8:
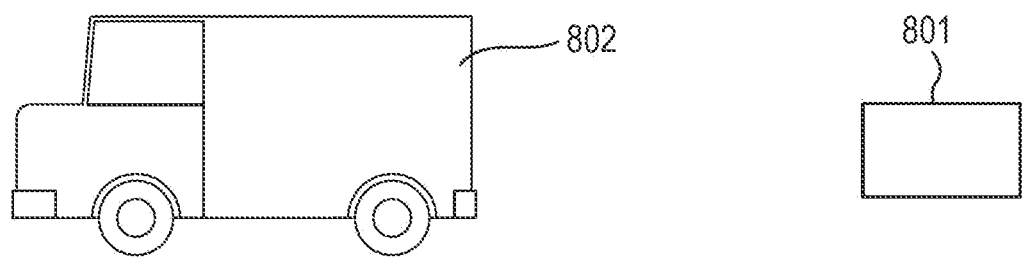
FIG. 8 is a schematic diagram of a vehicle comprising a controller.

With reference to FIG. 8, a controller 801 for a vehicle 802 is shown. The controller 801 is in communication with a vehicle 802. The controller 801 may be configured to perform the method 100 of the present disclosure. The controller 801 may comprise and/or be in communication with a transmitter (not shown) and/or a receiver (not shown), e.g. of the vehicle 802. In FIG. 8, the controller is shown as being remote from a vehicle 802. Alternatively the vehicle 802 may comprise the controller 801. The controller may comprise a processor configured to perform the method as described above (e.g. any of the steps thereof), for example executing the instructions 702.

The vehicle 802 may be partially or fully autonomous. The vehicle 802 may comprise a route guidance system.

Typical vehicle delivery systems may determine a delivery route according to a minimum distance travelled by the delivery vehicle in delivering the total number of items. However, the present inventors have determined that it may be beneficial to travel greater distances in order to optimize the value of a first vehicle performance parameter. For example, the present inventors have determined that it may be beneficial to travel a greater total distance in completing a delivery route in order to deliver the heaviest items first. This confers advantages, depending on the first vehicle parameter, on the total energy expended by the vehicle in completing the delivery route, and as such confers significant improvements of the carbon footprint of a delivery vehicle.

In a similar manner, the present inventors have determined that it may be further desirable to optimize the delivery route for only a subset M of the items N being delivered. This is because the process of optimization may be a resource-intensive activity. For example, if a large number of items is to be delivered, then computing all possible sequences, and thus routes, in which the items can be delivered is a resource (e.g. time, energy, processor) intensive activity. Otherwise, the improvements in the first vehicle parameter may be partially offset by the resources consumed in computing the optimized delivery route. The present inventors have thus determined that a balance may be reached if an optimized delivery route for a subset M of the total number of items N being delivered is determined. The subset M may be determined according to an item-dependent parameter, e.g. mass, size, shape, delivery deadline.

According to an example of the disclosure, the present method may be used to determine the best location for a delivery depot. For example, upon planning the construction of a new settlement, the geographic distribution of future delivery destinations (e.g. commercial and/or domestic premises) may be taken into account, in combination with environmental factors such as topology and/or road layout, to determine an optimal location of a delivery depot. The optimal location of the delivery depot may be determined such that for the delivery of a typical plurality of items to a typical plurality of delivery destinations, a delivery route may be determined that optimizes the value of the first vehicle parameter, the determination of the optimal location of the delivery depot having taken into account the geographic and environmental factors of the vicinity of the delivery depot and each of the typical delivery destinations.

According to a further example of the disclosure, items may be grouped for delivery such that multiple items may be delivered to a single location (e.g. lockers or group drop-off). In this way, a delivery route may be determined that optimizes the value of the first vehicle parameter, wherein at least one item or a plurality of items (e.g. a first group of items) may be delivered to each delivery destination (e.g. a plurality of items may be delivered to each delivery destination).

One example set of coded instructions that, when executed by a processor, may cause the processor to perform the method of the present disclosure is shown below. In other words, example instructions for the methods as described above are set forth below.

These instructions use map data that includes location, distance, speed limit and elevation in combination with vehicle mass input data that includes vehicle mass, number of items along with each of their masses and delivery destinations within that map.

These inputs are then used to iterate over a solution to generate a sequence of item delivery destinations that leads to the lowest energy expenditure for the total journey; each time the vehicle mass reduces by the given item mass and the route is recalculated again until there are no items left to drop off.

| PROGRAM < Example. > |
|---|

```
Using Map Data consisting of nodes each with x,y,z coordinates
Using Map Data consisting of nodes with known neighbours and weighted edges
Set startLocation % location of start point for journey
Set array destinationID[ ] % an array of the destinations that we will visit
Set vehicleMass % User input Vehicle Mass in kg
Set array destinationID[ ]
Set destintationID[startLocation,
dropOffPoint1, dropOffPoint2, dropOffPoint3, dropOffPoint4 ... dropOffPointn] % Index
destinationID[0] is starting location then add drop off points as required into array up
to n drop off points.
Set array cargoWeights[ ]
Set cargoWeights[0] = empty vehicle mass in kg
Add each parcel mass into cargoWeights array assocated with coresponding
desitiationID index
Set totalDestinations[[destinationID], [cargoWeights]]
Set destinations = destinationID.length
Set totalMass = sum of elements in array cargoWeights
Set journeyRoutes = all permutations of startID to all finishIds. % I.e.
journeyRoutes[[sequence1],[sequence2],[sequence3], ..., [sequencen]]
Set journeyCombos = (destinationID.length factorial)
Set currentMass = totalMass
Set routeEnergies[ ] %sum of route energy per sequence
Set destinationSequence = 1
While destinationSequence is less than journeyCombos
   Set currentMass = vehicleMass + totalCargo     %reset vehicleMass for each
   sequence of destinations
   Set currentLocation = 1                        %reset so each journey starts
   at startId
   For journeyRoutes[destinationSequence]
      While (currentLocation +1) is less than destinations
         For journeyRoutes[destinationSequence[currentLocation]] to
         journeyRoutes[destinationSequence[currentLocation + 1]]
         %start node to End node via known neighbour nodes.
            Set currentNode =
            journeyRoutes[destinationSequence[currentLocation]]
            While currentNode is not equal to
            journeyRoutes[destinationSequence[currentLocation +
            1]] %ShortestPathTree or equivalent function using
            workDone rather than Distance between nodes.
               Set distance = 3 dimensional distance between
               currentNode and neighbouringNode
               Set force = CurrentMass*Gravity
               Set
               workDone[destinationSequence[currentLocation]]
               =
               workDone[destinationSequence[currentLocation]]
               + (force*distance + Losses)
               Set current node to next neighbouringNode
            EndWhile
         EndFor
         Set currentMass = currentMass -
         totalDestination(journeyRoutes[destinationSequence
         [currentLocation + 1], destinationSequence[currentLocation +
         1]) %Adjust the total mass by the weight of the
         cargo removed (if removed)
         Set currentLocation = currentLocation + 1
      EndWhile
   EndFor
   Set destinationSequence = destinationSequence + 1
   Set routeEnergies[ ] = workdone[sum of energy in destinationSequence]
EndWhile
Set efficientRoute = index for minimum value for routeEnergies[ ]
Set path = journeyRoutes[efficientRoute]
Display path
END
```

While the present disclosure has been illustrated and described in detail in the drawings and foregoing description, such illustration and description are to be considered illustrative or exemplary and not restrictive; the disclosure is not limited to the disclosed embodiments. Various alternative examples are discussed through the detailed description. Other variations to the disclosed embodiments can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly illustrated or described.

What is claimed is:

1. A method for optimizing a delivery of N items (with N>3), to a plurality of delivery destinations for a delivery vehicle, each one of the N items being deliverable to one of the plurality of delivery destinations, the method comprising:
   utilizing a load cell of the vehicle to determine a mass of each item as the items are successively loaded onto the vehicle;
   calculating the value of a first vehicle parameter for a plurality of delivery routes, each delivery route being a route to stop at the respective delivery destinations for the heaviest M items (with M<N), wherein each route stops at the respective delivery destinations for the heaviest M items in a different order;
   determining an optimized delivery route for the vehicle that comprises the respective delivery destinations for the heaviest M items and that optimizes the value of the first vehicle parameter;
   routing the vehicle according to the optimized delivery route, thereby improving energy efficiency of the delivery vehicle; and
   delivering the remainder of the items (M≤N) without optimizing those items with respect to the first vehicle parameter, thereby reducing computational size and complexity of calculating the first vehicle parameter for all N items.

2. The method of claim 1 further comprising:
   programming, into a route guidance system of the vehicle, the optimized delivery route having optimized the first vehicle parameter.

3. The method of claim 1, wherein the first vehicle parameter further comprises at least one of:
   an amount of energy remaining in an energy store of the vehicle; or
   an amount of pollution emitted by the vehicle in taking the optimized delivery route.

4. The method of claim 1, further comprising:
   transmitting a signal which, when received by the vehicle, causes the vehicle to drive, following the optimized delivery route, under autonomous control.

5. The method of claim 1, further comprising:
   transmitting a signal which, when received by a fleet management module, causes the fleet management module to transmit instructions to at least one vehicle in a fleet of vehicles to drive, following the optimized delivery route, under autonomous control.

6. The method of claim 1, further comprising: in response to an input describing a new destination,
   modifying a first delivery route of the plurality of delivery routes to derive a modified first delivery route, the modified first delivery route being a route to stop at a first delivery destination of the plurality of delivery destinations, then the new destination, then a second delivery destination of the plurality of delivery destinations, and/or
   modifying a second delivery route of the plurality of delivery routes to derive a modified second delivery route, the modified second delivery route being a route to stop at the second delivery destination, then the new destination, then the first delivery destination;
   and calculating the value of the first vehicle parameter for the modified first delivery route and the modified second delivery route.

7. The method of claim 1, further comprising selecting the first vehicle parameter and/or adjusting the first vehicle parameter.

8. The method of claim 1, wherein each route in the plurality of delivery routes stops at each of the plurality of delivery destinations for the N items.

9. The method of claim 1, further comprising:
   determining whether there exists a non-refueling delivery route such that a first vehicle can deliver each item to its respective delivery destination, without stopping to refuel, such that the value of the first vehicle parameter is optimized.

10. The method of claim 9, wherein, in response to a determination that no non-refueling delivery route exists such that the first vehicle can deliver each item to its respective delivery destination without refueling, the method further comprises:
    calculating the value of the first vehicle parameter for:
    a composite route for the first vehicle to deliver each item to its respective delivery destinations in two sub-routes, stopping to refuel in between the two sub-routes; and
    for a sum of a first vehicle route and a second vehicle route, the first vehicle route being a route for the first vehicle to deliver a first subset of the plurality of items to their respective delivery destinations in one trip without refueling, and the second vehicle route being a route for a second vehicle to deliver a second subset of the plurality of items, the second subset comprising the remaining items, to their respective destinations in one trip without refueling.

11. The method of claim 10, wherein, if the value of the first vehicle parameter is lower for the composite route then the method comprises:
    transmitting a signal to the first vehicle which, when received by the first vehicle causes the composite route to be programmed into a route guidance system of the first vehicle and/or causes the first vehicle to begin driving the composite route, under autonomous control; and, if the value of the first vehicle parameter is lower for a sum of the first and second vehicle routes, then the method comprises:
    transmitting a signal to a fleet management module to cause the fleet management module to cause the first vehicle route to be programmed into the route guidance system of the first vehicle and the second vehicle route to be programmed into a route guidance system of a second vehicle and/or cause the first and second vehicles to begin driving the first and second vehicles routes, respectively, under autonomous control.

12. The method of claim 1, wherein, if the vehicle delivering the plurality of items according to a given delivery route is unable to deliver one item of the plurality of items, then the method comprises:
    re-calculating the value of the first vehicle parameter for the given delivery route based on a mass of the one item of the plurality of items that the vehicle is unable to deliver;
    determining a location of a depot at which the vehicle is able to drop off the one item it is unable to deliver;
    calculating the value of the first vehicle parameter for a further delivery route being a route to stop at the depot, then the respective delivery destinations of all undelivered items; and determining which one of the given delivery route or the further delivery route optimizes the first vehicle parameter.

13. The method of claim 12, wherein, in response to a determination that the further delivery route optimizes the first vehicle parameter, the method further comprises: causing the further delivery route to be programmed into a route guidance system of the vehicle.

14. The method of claim 1 wherein the first vehicle parameter is also dependent on a mass of the vehicle configured to transport at least one of the items.

15. The method of claim 1, wherein:
a first delivery route of the plurality of delivery routes is a route to stop at a first delivery destination of the plurality of delivery destinations before a second delivery destination of the plurality of delivery destinations that optimizes the value of the first vehicle parameter; and/or
a second delivery route of the plurality of delivery routes is a route to stop at the second delivery destination before the first delivery destination that optimizes the value of the first vehicle parameter.

16. The method of claim 1, further comprising driving a farther than shortest distance to drop off a heaviest item of the items due to the first vehicle parameter, thereby decreasing mass of the delivery vehicle by the mass of the heaviest item to be more energy efficient overall.

17. A vehicle for optimizing a delivery of N items (with N>3), to a plurality of delivery destinations, each one of the N items being deliverable to one of the plurality of delivery destinations, comprising:
a load cell of the vehicle, configured to determine a mass of each item as the items are successively loaded onto the vehicle; and
a controller programmed to
calculating the value of a first vehicle parameter for a plurality of delivery routes, each delivery route being a route to stop at the respective delivery destinations for the heaviest M items (with M<N), wherein each route stops at the respective delivery destinations for the heaviest M items in a different order;
determine an optimized delivery route for a vehicle that comprises the respective delivery destinations for the heaviest M items and that optimizes the value of the first vehicle parameter; route the vehicle according to the optimized delivery route, thereby improving energy efficiency of the vehicle;
deliver the remainder of the items (M N) without optimizing those items with respect to the first vehicle parameter, thereby reducing computational size and complexity of calculating the first vehicle parameter for all N items.

18. The vehicle of claim 17, wherein the controller is further programmed to:
determine whether there exists a non-refueling delivery route such that a first vehicle can deliver each item to its respective delivery destination, without stopping to refuel, such that the value of the first vehicle parameter is optimized;
in response to a determination that no non-refueling delivery route exists such that the first vehicle can deliver each item to its respective delivery destination without refueling, calculating the value of the first vehicle parameter for:
a composite route for the first vehicle to deliver each item to its respective delivery destinations in two sub-routes, stopping to refuel in between the two sub-routes; and
for a sum of a first vehicle route and a second vehicle route, the first vehicle route being a route for the first vehicle to deliver a first subset of the plurality of items to their respective delivery destinations in one trip without refueling, and the second vehicle route being a route fora second vehicle to deliver a second subset of the plurality of items, the second subset comprising the remaining items, to their respective destinations in one trip without refueling,
wherein, if the value of the first vehicle parameter is lower for the composite route, transmit a signal to the first vehicle which, when received by the first vehicle causes the composite route to be programmed into a route guidance system of the first vehicle and/or causes the first vehicle to begin driving the composite route, under autonomous control; and
if the value of the first vehicle parameter is lower for a sum of the first and second vehicle routes, transmit a signal to a fleet management module to cause the fleet management module to cause the first vehicle route to be programmed into the route guidance system of the first vehicle and the second vehicle route to be programmed into a route guidance system of a second vehicle and/or cause the first and second vehicles to begin driving the first and second vehicles routes, respectively, under autonomous control.

19. A non-transitory machine-readable medium comprising instructions for optimizing a delivery of N items (with N>3), to a plurality of delivery destinations, each one of the N items being deliverable to one of the plurality of delivery destinations, such that when the instructions are executed by a processor of a vehicle, the processor is configured to:
utilize a load cell of the vehicle to determine a mass of each item as the items are successively loaded onto the vehicle;
calculate the value of a first vehicle parameter for a plurality of delivery routes, each delivery route being a route to stop at the respective delivery destinations for the heaviest M items (with M<N), wherein each route stops at the respective delivery destinations for the heaviest M items in a different order;
determine an optimized delivery route for the vehicle that comprises respective delivery destinations for the heaviest M items and that optimizes the value of the first vehicle parameter;
route the vehicle according to the optimized delivery route, thereby improving energy efficiency of the vehicle; and
deliver the remainder of the items (M N) without optimizing those items with respect to the first vehicle parameter, thereby reducing computational size and complexity of calculating the first vehicle parameter for all N items.

20. The medium of claim 19, further comprising instructions which, when executed by the processor, causes the processor to:
determine whether there exists a non-refueling delivery route such that a first vehicle can deliver each item to its respective delivery destination, without stopping to refuel, such that the value of the first vehicle parameter is optimized;
in response to a determination that no non-refueling delivery route exists such that the first vehicle can deliver each item to its respective delivery destination without refueling, calculating the value of the first vehicle parameter for:

a composite route for the first vehicle to deliver each item to its respective delivery destinations in two sub-routes, stopping to refuel in between the two sub-routes; and for a sum of a first vehicle route and a second vehicle route, the first vehicle route being a route for the first vehicle to deliver a first subset of the plurality of items to their respective delivery destinations in one trip without refueling, and the second vehicle route being a route for a second vehicle to deliver a second subset of the plurality of items, the second subset comprising the remaining items, to their respective destinations in one trip without refueling, wherein, if the value of the first vehicle parameter is lower for the composite route, transmit a signal to the first vehicle which, when received by the first vehicle causes the composite route to be programmed into a route guidance system of the first vehicle and/or causes the first vehicle to begin driving the composite route, under autonomous control; and if the value of the first vehicle parameter is lower for a sum of the first and second vehicle routes, transmit a signal to a fleet management module to cause the fleet management module to cause the first vehicle route to be programmed into the route guidance system of the first vehicle and the second vehicle route to be programmed into a route guidance system of a second vehicle and/or cause the first and second vehicles to begin driving the first and second vehicles routes, respectively, under autonomous control.

* * * * *